(12) United States Patent
Rand et al.

(10) Patent No.: US 12,489,648 B2
(45) Date of Patent: Dec. 2, 2025

(54) METHODS AND SYSTEMS FOR STREAMING BLOCK TEMPLATES WITH CROSS-REFERENCES

(71) Applicant: nChain Licensing AG, Zug (CH)

(72) Inventors: Ricky Charles Rand, London (GB); Steven Patrick Coughlan, London (GB)

(73) Assignee: nChain Licensing AG, Zug (CH)

( * ) Notice: Subject to any disclaimer, the term of this patent is extended or adjusted under 35 U.S.C. 154(b) by 121 days.

(21) Appl. No.: 18/265,220

(22) PCT Filed: Nov. 24, 2021

(86) PCT No.: PCT/EP2021/082871
§ 371 (c)(1),
(2) Date: Jun. 2, 2023

(87) PCT Pub. No.: WO2022/117418
PCT Pub. Date: Jun. 9, 2022

(65) Prior Publication Data
US 2024/0106669 A1    Mar. 28, 2024

(30) Foreign Application Priority Data

Dec. 4, 2020   (GB) ...................................... 2019125

(51) Int. Cl.
*H04L 9/00*    (2022.01)
*H04L 9/32*    (2006.01)

(52) U.S. Cl.
CPC .............. *H04L 9/50* (2022.05); *H04L 9/3297* (2013.01)

(58) Field of Classification Search
CPC ............ H04L 9/32; H04L 9/3297; H04L 9/50
See application file for complete search history.

(56) References Cited

U.S. PATENT DOCUMENTS

| 8,706,701 B1 | 4/2014 | Stefanov et al. |
| 10,250,708 B1 | 4/2019 | Carver et al. |

(Continued)

FOREIGN PATENT DOCUMENTS

| JP | 2003203029 A | 7/2003 |
| JP | 2006004277 A | 1/2006 |

(Continued)

OTHER PUBLICATIONS

Decker C., et al., "Information Propagation in the Bitcoin Network," 13th IEEE International Conference on Peer-to-Peer Computing, Sep. 2013, pp. 1-10.

(Continued)

*Primary Examiner* — Boris D Grijalva Lobos
(74) *Attorney, Agent, or Firm* — Messner Reeves LLP

(57) ABSTRACT

Methods and devices for compressing transaction identifiers by a first mining node in a blockchain network. The method may include building a first candidate block containing a first ordered list of transaction identifiers; receiving, from a second mining node, data defining a second ordered list of transaction identifiers in a second candidate block being mined by the second mining node; determining that at least one of the transaction identifiers in the first ordered list is also in the second ordered list; generating an append message containing data defining the first ordered list of transaction identifiers, wherein the data specifies said at least one transaction identifier in the first ordered list of transaction identifiers by including an index position of said at least one transaction identifier in the second ordered list of transaction identifiers; and transmitting the append message to the second mining node.

20 Claims, 15 Drawing Sheets

(56) References Cited

U.S. PATENT DOCUMENTS

| | | |
|---|---|---|
| 10,372,943 B1 | 8/2019 | Rodriguez De Castro et al. |
| 10,742,421 B1 | 8/2020 | Wentz et al. |
| 10,984,134 B2 | 4/2021 | Setty et al. |
| 11,038,685 B1 | 6/2021 | Dennis |
| 11,368,286 B1 | 6/2022 | Wang |
| 11,487,886 B2 | 11/2022 | Koorella et al. |
| 2008/0195583 A1 | 8/2008 | Hsu et al. |
| 2008/0224906 A1 | 9/2008 | Plamondon |
| 2010/0217798 A1 | 8/2010 | Asami |
| 2012/0030468 A1 | 2/2012 | Papamanthou et al. |
| 2012/0222130 A1 | 8/2012 | Lee et al. |
| 2015/0317748 A1 | 11/2015 | Roberts et al. |
| 2017/0178072 A1 | 6/2017 | Poornachandran et al. |
| 2017/0243176 A1 | 8/2017 | Hanke et al. |
| 2017/0316497 A1 | 11/2017 | Song et al. |
| 2017/0344435 A1 | 11/2017 | Davis |
| 2017/0344987 A1 | 11/2017 | Davis |
| 2018/0013567 A1 | 1/2018 | Davis |
| 2018/0285840 A1 | 10/2018 | Hasan |
| 2018/0307857 A1 | 10/2018 | Beecham et al. |
| 2018/0323980 A1 | 11/2018 | Ahn et al. |
| 2019/0034465 A1 | 1/2019 | Shimamura |
| 2019/0054836 A1 | 2/2019 | Haneda |
| 2019/0082007 A1 | 3/2019 | Klarman et al. |
| 2019/0109709 A1 | 4/2019 | Wu |
| 2019/0156301 A1 | 5/2019 | Bentov et al. |
| 2019/0199515 A1 | 6/2019 | Carver et al. |
| 2019/0273733 A1 | 9/2019 | Kawabata |
| 2019/0340379 A1 | 11/2019 | Beecham |
| 2019/0349733 A1 | 11/2019 | Nolan et al. |
| 2019/0370789 A1 | 12/2019 | McCallum |
| 2020/0073698 A1 | 3/2020 | Wu |
| 2020/0119936 A1 | 4/2020 | Balasaygun et al. |
| 2020/0127834 A1 | 4/2020 | Westland et al. |
| 2020/0136808 A1 | 4/2020 | Chasko et al. |
| 2020/0162473 A1 | 5/2020 | Mercuri et al. |
| 2020/0210451 A1 | 7/2020 | Wang |
| 2020/0234293 A1 | 7/2020 | Lee et al. |
| 2020/0285634 A1 | 9/2020 | Jho et al. |
| 2020/0328892 A1* | 10/2020 | Gangal ................. H04L 9/0825 |
| 2020/0366495 A1 | 11/2020 | Mahoney |
| 2020/0372003 A1 | 11/2020 | Boelderl-Ermel et al. |
| 2021/0056544 A1 | 2/2021 | Mitra et al. |
| 2021/0117385 A1 | 4/2021 | Haldar et al. |
| 2021/0182895 A1 | 6/2021 | Sears et al. |
| 2021/0209070 A1 | 7/2021 | Latorre et al. |
| 2021/0209077 A1 | 7/2021 | Snellman et al. |
| 2021/0326442 A1 | 10/2021 | Campagna et al. |
| 2021/0365867 A1 | 11/2021 | Kim |
| 2022/0094791 A1 | 3/2022 | Moller et al. |
| 2022/0100724 A1 | 3/2022 | Zhang et al. |
| 2022/0191037 A1 | 6/2022 | Hassanzadeh Nazarabadi et al. |

FOREIGN PATENT DOCUMENTS

| | | |
|---|---|---|
| JP | 2019139691 A | 8/2019 |
| JP | 2020522786 A | 7/2020 |
| WO | 2018145168 A1 | 8/2018 |
| WO | 2018224954 A1 | 12/2018 |
| WO | 2018224955 A1 | 12/2018 |
| WO | 2018229633 A1 | 12/2018 |
| WO | 2019003083 A1 | 1/2019 |
| WO | 2019021107 A1 | 1/2019 |
| WO | 2019077126 A1 | 4/2019 |
| WO | 2020208596 | 10/2020 |

OTHER PUBLICATIONS

Sarda A., et al., "NoCo: An Efficient Transaction Propagation Protocol for Open Blockchains," 2018 Second International Conference on Advances in Computing, Control and Communication Technology (IAC3T), Sep. 2018, pp. 41-47.

Sudhan A., et al., "Peer Selection Techniques for Enhanced Transaction Propagation in Bitcoin Peer-to-Peer Network," 2018 Second International Conference on Intelligent Computing and Control Systems (ICICCS), Jun. 2018, pp. 679-684.

Corallo M., "Compact Block Relay," Apr. 27, 2014, Retrieved from the Internet: URL: https://github.com/bitcoin/bips/blob/master/bip-0152.mediawiki, 17 pages.

International Search Report and Written Opinion issued in International Application No. PCT/IB2020/053416, mailed on Jun. 26, 2020, 15 pages.

International Search Report and Written Opinion issued in International Application No. PCT/IB2020/053436, mailed on Jul. 3, 2020, 14 pages.

Ozisik P., et al., "Graphene: A New Protocol for Block Propagation Using Set Reconciliation," UMASS Amherst, 65 pages.

Ozisik P., et al., "Graphene: A New Protocol for Block Propagation Using Set Reconciliation," UMASS Amherst, 9 pages.

Search Report for the Application No. GB1905221.6 dated Oct. 9, 2019, 4 pages.

PCT/EP2021/082871 International Search Report and Written Opinion dated Feb. 25, 2022, 14 pages.

Sunny Katkuri: "A survey of data transfer and storage techniques in prevalent cryptocurrencies and suggested improvements" arxiv.org, Cornell University Library, 201 Olin Library Cornell University Ithaca, NY 14853, Aug. 10, 2018 (Aug. 10, 2018), XP080903165, abstract pp. 1-24 pp. 36-40 pp. 53-56.

Donghui Ding et al: "Txilm: Lossy Block Compression with Salted Short Hashing", arxiv.org, Cornell University Library, 201 Olin Library Cornell University Ithaca, Ny 14853, Jun. 15, 2019 (Jun. 15, 2019), XP081381997, abstract pp. 1-4.

Han Yilin Yilin@Conflux-Chain Org et al: "Shrec: Bandwidth-Efficient Transaction Relay in High-Throughput Blockchain Systems", Proceedings of the 11th ACM Symposium on Cloud Computing, ACMPUB27, New York, NY, USA, Oct. 12, 2020 (Oct. 12, 2020), pp. 238-252, XP058477992,DOI: 10.1145/3419111.3421283ISBN: 978-1-4503-8137-6 abstract pp. 238-250.

Antonopoulos A.M., et al., "Bitcoin and a Blockchain," First Edition, NTT Publication Incorporated company, Apr. 18, 2018, 11 Pages.

JP2021-560040 English Translation of Office Action of Japan Patent Office dated May 21, 2024, 5 pages.

\* cited by examiner

| Field size (Bytes) | Name | Data type | Description |
|---|---|---|---|
| 4 | Version | int32_t | Block version information (note, this is signed) |
| 32 | prev_block | char[32] | The hash value of the previous block this particular block references |
| 32 | merkle_root | char[32] | The reference to a Merkle tree collection which is a hash of all transactions related to this block |
| 4 | timestamp | uint32_t | A Unix timestamp recording when this block was created (Currently limited to dates before the year 2106) |
| 4 | bits | uint32_t | The calculated difficulty target being used for this block |
| 4 | nonce | uint32_t | The nonce used to generate this block. This variable is iterated until the hash of the block header |
| 1+ | txn_count | varint | Number of transaction entries |
| ? | txns | tx[] | Block transactions, in format of 'tx' command |

FIG. 1

METHODS AND SYSTEMS FOR STREAMING BLOCK TEMPLATES WITH CROSS-REFERENCES

CROSS REFERENCE TO RELATED APPLICATIONS

This application is the U.S. National Stage of International Application No. PCT/EP2021/082871 filed on Nov. 24, 2021, which claims the benefit of United Kingdom Patent Application No. 2019125.0, filed on Dec. 4, 2020, the contents of which are incorporated herein by reference in their entireties.

TECHNICAL FIELD

The present disclosure relates to blockchain networks and, in particular, to improving the speed of propagation of blocks amongst miner nodes and/or reducing the bandwidth required to propagate blocks.

BACKGROUND

In proof-of-work blockchain systems, when a miner finds a valid block it tries to quickly communicate its success to all other miners. This involves propagating information regarding the block through the blockchain network to all the mining nodes. In some cases, this may involve sending the full block data. In some cases, this may involve sending block header and transaction list information. Receiving miners validate the new block by hashing the header and confirming it matches the hash value provided by the successful miner.

As blocks increase in size and transaction count, delay in block propagation can exacerbate the problems of temporary forks and orphan blocks. These situations are costly to miners and to the system overall.

It may be advantageous when propagating block data to devise methods and systems for reducing the bandwidth consumed by block data and improving the speed of propagation.

BRIEF DESCRIPTION OF THE DRAWINGS

Reference will now be made, by way of example, to the accompanying drawings which show example embodiments of the present application and in which:

FIG. 1 shows an example block structure for a blockchain network;

Like reference numerals are used in the drawings to denote like elements and features.

DETAILED DESCRIPTION OF EXAMPLES

Figure 2:
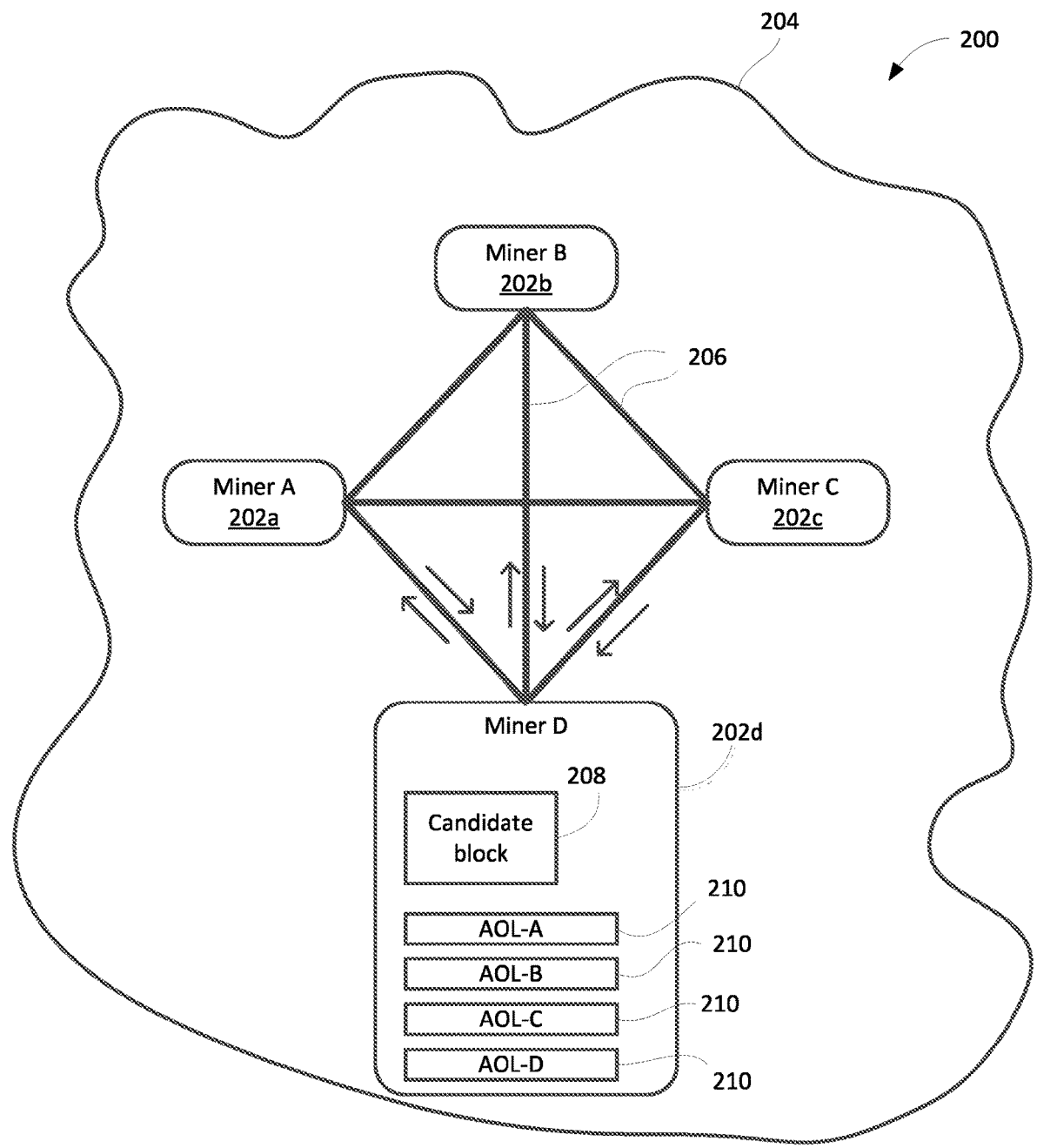
FIG. 2 diagrammatically illustrates an example of a streaming block template network.

In one aspect, there may be provided a computer-implemented method of compressing transaction identifiers by a first mining node in a blockchain network. The method may include building a first candidate block containing a first ordered list of transaction identifiers; receiving, from a second mining node, data defining a second ordered list of transaction identifiers in a second candidate block being mined by the second mining node; determining that at least one of the transaction identifiers in the first ordered list is also in the second ordered list; generating an append message containing data defining the first ordered list of transaction identifiers, wherein the data specifies said at least one transaction identifier in the first ordered list of transaction identifiers by including an index position of said at least one transaction identifier in the second ordered list of transaction identifiers; and transmitting the append message to the second mining node.

In some implementations, generating includes determining that the index position is more compact than a compressed transaction identifier for said at least one transaction identifier. In some cases, determining that the index position is more compact includes generating the compressed transaction identifier. In some cases, the first mining node and the second mining node define compressed transaction identifiers of at least two lengths and generating the compressed transaction identifier includes determining that said at least one transaction identifier requires a longer of the at least two lengths due to a collision and, on that basis, determining that the index position is more compact.

In some implementations, the method may further include receiving, from a third mining node, data defining a third ordered list of transaction identifiers in a third candidate block being actively mined by the third mining node; determining that one of the transaction identifiers in the first ordered list is also in the third ordered list; and specifying said one of the transaction identifiers in the append message by including a reference to the third ordered list an index position of said one of the transaction identifiers in the third ordered list of transaction identifiers. In some cases, specifying includes first determining that the second mining node stores the third ordered list. In some cases, the method may further include receiving, from the second mining node, data specifying lists stored at the second mining node, and wherein the data specifying lists includes a reference to the third ordered list.

In some implementations, the method may further include receiving a second append message from the second mining node, the second append message including data defining a further ordered list of transaction identifiers, resolving the data to obtain the further ordered list of transaction identifiers, and storing the further ordered list of transaction identifiers appended to the second ordered list of transaction identifiers. In some cases, the data includes a reference to a transaction identifier in the first ordered list of transaction identifiers. In some cases, the reference includes an index position with the first ordered list, and resolving includes obtaining the transaction identifier at the index position in the first ordered list.

In some implementations, the method may further include receiving a second append message from the second mining node, the second append message including data defining a further ordered list of transaction identifiers, resolving the data to obtain the further ordered list of transaction identifiers, and storing the further ordered list of transaction identifiers appended to the second ordered list of transaction identifiers, wherein the data includes a reference to a transaction identifier in the third ordered list of transaction identifiers. In some cases, the reference includes a reference to the third ordered list and an index position within the third ordered list, and resolving includes obtaining the transaction identifier at the index position in the third ordered list. In some cases, the method further includes sending the second mining node an initialization message that references the third ordered list of transactions.

In another aspect, there may be provided a computing device to compress transaction identifiers in a blockchain network. The computing device may include one or more processors; memory; and processor-executable instructions stored in the memory that, when executed by the one or more processors, cause the processors to carry out one or more of the methods described herein.

In yet another aspect, the present application provides a computer-readable medium storing processor-executable instructions for compressing transaction identifiers in a blockchain network, the processor-executable instructions including instructions that, when executed by one or more processors, cause the processors to carry out one or more of the methods described herein.

Other example embodiments of the present disclosure will be apparent to those of ordinary skill in the art from a review of the following detailed description in conjunction with the drawings.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

The present application will refer to hashing or a hash function, which is intended to include any one of a number of cryptographic hash functions that, when applied to an arbitrary set of data or "message", deterministically produce a unique fixed-length alphanumeric string. The result of a hash function may be called a hash value, fingerprint, hash result, or equivalent. Examples include, but are not limited to, SHA-2, SHA-3, and BLAKE2. Any reference below to a miner hashing a block or a candidate block will be understood to mean applying a cryptographic hash function to the header portion of the candidate block. The hash function used may be any suitable hash function unless a particular hash function is specified.

In this document the term 'blockchain' is understood to include all forms of electronic, computer-based, distributed ledgers. These include consensus-based blockchain and transaction-chain technologies, permissioned and un-permissioned ledgers, shared ledgers and variations thereof. The most widely known application of blockchain technology is the Bitcoin ledger, although other blockchain implementations have been proposed and developed. While Bitcoin, as exemplified by the Bitcoin SV protocol, may be referred to herein for the purpose of convenience and illustration, it should be noted that the invention is not limited to use with the Bitcoin blockchain and alternative blockchain implementations and protocols fall within the scope of the present invention.

A blockchain is a peer-to-peer, electronic ledger which is implemented as a computer-based decentralised, distributed system made up of blocks which in turn are made up of transactions. Each transaction is a data structure that encodes the transfer of control of a digital asset between participants in the blockchain system and includes at least one input and at least one output. Each block contains a hash of the previous block to that blocks become chained together to create a permanent, unalterable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language.

The blockchain is implemented over a network of nodes. Each node is a computing device with network connectivity and executing software that carries out the applicable blockchain protocol. Nodes validate transactions and propagate them to other nodes in the network. Specialized network nodes, termed "mining nodes" or "miners", collect a set of unconfirmed transactions, i.e. pending transactions, into a block and attempt to "mine" the block. Mining, in these examples, refers to solving a proof-of-work (POW) before any other miner in the network succeeds in solving a proof-of-work for their respective block. In the Bitcoin example, a POW involves hashing a block header containing a nonce until the result is below a threshold value set by a difficultly parameter. The nonce is repeated incremented and the hashing repeated until the result is below the threshold value or until the miner receives notice that another miner has succeeded. Variations in mining process will be familiar to those ordinarily skilled in the art.

A typical block contains two data structures: a block header and transactions. FIG. 1 diagrammatically illustrates an example block structure 100 from the Bitcoin protocol. The block structure 100 includes a block header 102 and a payload 104. The block header 102 in this example includes fields for a version number 106, a previous block hash value 108, a Merkle root 110, a timestamp 112, a target difficulty parameter 114, and a nonce 116. The previous block hash value 108 chains this block to the previous block in the chain, thereby resulting in the "blockchain" structure that links successive blocks together through cryptographic hashes. The Merkle root 110 refers to a Merkle tree structure based on all the transactions contained in the block. The nonce 116 is an arbitrary value that the mining node can repeated increment or decrement to change the contents of the block header 102 in order to produce different hash results when mining.

The payload 104 includes a transaction count value 118 and the list of transactions 120. The list of transactions 120 may be a list of transaction ID numbers in some implementations.

When a mining node succeeds in finding a block header that produces a hash result that is below the threshold value, then it proceeds to notify other nodes using an updated inventory message that includes the successful hash result value. The other nodes then request a copy of the new block and independently verify its validity.

The blockchain ecosystem is maturing to provide increased usability through a large increase in transaction volume and, as a consequence, block sizes. As blocks become larger, in some cases exceeding 128 MB, propagating a successfully mined new block to other nodes throughout the network takes an increased time. The delay in propagation comes at a cost. First, the miners that are unaware of that a successfully-mined block has been created will continue attempting to mine their own candidate blocks in a wasted effort if the new block proves to be valid. Second, the delay in propagation and validation may result in an increased likelihood of (temporary) forks and orphan blocks.

It will be appreciated that in many blockchain protocols, the miner does not send a full copy of the block, but instead sends the hash results in an inventory message. The receiving mining nodes determine that they have not seen this alleged new block and send a GETBLOCK or GETDATA message to the successful miner. Rather than sending a full copy of the block, the successful miner sends the block header, the transaction count field from the payload, and an ordered list of the transactions included in the block. The ordered list may include a set of the full transaction ID numbers (TxIDs) for the transactions. The TxIDs may, in some embodiments, be a fixed length hash of the transaction. The TxID may be a 256-bit (32-byte) number obtained by hashing the transaction using SHA-256 for instance. A receiving node may reassemble the full block by retrieving the identified transactions from the mempool by their TxIDs.

Nevertheless, as modern block sizes grow to 128 MB and beyond the size of the data to be transmitted may still be significant if the count of transactions is large. For example, a block containing half a million transactions would have an ordered list of TxIDs that is 16 MB.

Accordingly, as is described in PCT Patent Publications WO2020/208590 and WO2020/208596, it has been proposed that mining nodes provide other miners with information about their respective candidate blocks while hashing their candidate blocks. In this manner, each miner exploits the time delay between the discovery of successful blocks, which in the example of Bitcoin is about ten minutes, to provide other miners with details regarding the structure and content of the candidate block upon which the miner is working. By providing this information in advance, when a successful block is found the successful miner need only send information from the block header and, in some cases, a coinbase transaction in order to ensure all other nodes can assemble and validate the complete new block. This data may be as little as a few hundred bytes. This increases the speed with which a successful new block is propagated through the full network. The contents of PCT Patent Publications WO2020/208580 and WO2020/208596 are hereby incorporated by reference.

The pre-solution propagation of candidate block data amongst miner may be referred to as streaming block templates (SBT). Each miner provides other miner with an ordered list of transaction identifiers in the candidate block upon which it is currently working. In some cases, the transaction identifiers may be send as truncated transaction identifiers to save bandwidth. PCT Patent Publication WO2020/208596 details methods of resolving conflicts in the case of truncated transaction identifiers.

To illustrate by way of example, reference will now be made to FIG. 2, which diagrammatically illustrates a simplified system 200 for pre-distributing block data in a blockchain system. In this example, the system 200 includes four mining nodes 202: miner A 202a, miner B 202b, miner C 202c, and miner D 202d. The mining nodes 202 are nodes in a blockchain network 204, which may include other nodes (not illustrated). The other nodes may include full nodes, SPV nodes, mining nodes, or other types of blockchain nodes.

Each mining node 202 may be implemented on a computing device, which may include one or more processing units. As will be appreciated by those skilled in the art the processing units may include specialized processing units with dedicated hardware designed to carry out the calculation operations associated with blockchain mining with significant speed and efficiency. However, it may also or alternatively include a general purpose computing device. The computing device includes processor-executable software that includes processor-readable instructions that, when executed, cause the one or more processing units to carry out the operations described. The computing device includes memory and a network connection with the associated hardware and software for obtaining network connectivity and sending and receiving messages in accordance with the applicable network protocol.

Each mining node 202 receives and validates transactions from the blockchain network 204 and builds a candidate block for mining. For example, miner D 202d builds a candidate block 208 that contains an ordered set of validated transactions for which it then attempts to find a proof-of-work.

In the meantime, miner D 202d sends a block template, i.e. information regarding the ordered list of transactions in its candidate block 208, to the other mining nodes 202. It also receives information from each of the other mining nodes 202 regarding the respective candidate blocks upon which they are mining. Miner D 202d stores that information in an append-only list (AOL) 210 for each of the other mining nodes. That is, for example, miner D 202d builds an append-only list 210 for miner A 202a based on messages it receives from miner A 202a specifying the ordered contents of its candidate block. At the same time, miner D 202d may build and maintain a record, such as AOL-D, recording the ordered list of transaction information that it has sent to other nodes. This may be helpful for synchronizing the candidate block 208 and the AOL-D data when a POW solution is found, as will be explained further below.

It will be appreciated that pre-distributing candidate block information so that each mining node 202 has a respective ordered list of transactions (AOL) for each other mining node 202 that reflects the respective candidate blocks ensures only a minimum amount of information need be propagated after the POW is found. This ensures that mining nodes 202 have the information they require to validate a new block as soon as possible, thereby reducing time wasted in searching for a POW when another mining node 202 has already succeeded. Mining nodes 202 have every incentive to propagate and validate new blocks as quickly as possible so that they can move onto searching for the next block. Potential delays due to network latency are of much less concern when pre-distributing ordered lists of transactions during the approximately ten-minute period between successive blocks.

When one of the mining nodes 202 is successful in finding a POW for its candidate block, it sends the other mining nodes 202 a message that includes at least some of the block header information needed by those mining nodes 202 to reconstruct the solved block using that mining node's AOL 210. For example, the message may contain the nonce and the timestamp, along with the hash value obtained when hashing the full block header.

In some implementations, messages between mining nodes 202 relating to AOLs 210 may include a template identifier for the current streaming block template. This may be referred to herein as an SB template identifier. The SB template identifier may be specific to a mining node 202 and to a block level, so that it refers to a specific candidate block, i.e. a specific ordered list of transactions. Any messaging from a mining node 202 relating to its ordered list of transactions (AOL) may include the SB template identifier to ensure that receiving mining nodes 202 associate the changes with the correct specific ordered list of transactions. In one implementation, the SB template identifier may be a hash of a miner identifier (miner ID) and the prev_block field in the block header, i.e. the hash of the previous block:

$$TmID = H(\text{prev block} \| \text{miner ID})$$

This ties the SB template identifier to a block level and specific miner.

Each message relating to ordered lists may further include a sequence number. The sequence number may be an unsigned integer value used to indicate the order of messages from one miner in association with a specific template. Sequencing is helpful to a message receiver to uniquely determine the TXID ordering for a specific miner in the case that some messages are not received or are received out of order. Accordingly, each append message may include both an SB template identifier and a sequence number. The SB template identifier may remain constant for a block while the sequence number is incremented with each message sent relating to that SB template identifier.

The SB template identifier discussed herein is different and distinct from a "template identifier" (template_id) or "candidate block identifier" (cb_id) that may be used by a transaction processor or block assembler within a miner to represent the content of a candidate block at a particular point in time during which that version of the candidate block is passed to a mining unit. As will be discussed later below, the content of a candidate block may change over time as transactions are added and the updated candidate block is passed to various mining units that are available to work on the candidate block. The template_id (or cb_id), which may take the form <base>.<sequence_number> in some implementations, tracks the state of that candidate block over time so that when a mining unit returns a solution the block assembler or transaction processor knows what version of the candidate block the mining unit was working upon. Meanwhile, the streaming block template process is carried out somewhat asynchronously with the template building process, and the append messages sent to alert other miners to the transactions included in the current miner's candidate block may become decoupled from the state of the candidate block and, in particular, the version of the candidate block for which as solution has been found. Accordingly, as will be described further below, the miner may engage in a synchronization process once a POW solution is discovered.

As mentioned above, miner ID may be a mining node's IP address or some other unique identifier for the mining node 202. In some embodiments, an initial authentication operation may occur when the miner attaches to the network that results in associating a unique miner ID to that mining node 202. The authentication operation may include a handshaking operation in which each mining node 202 provides a public key and digital signature. Authentication is connected to verification of the digital signature. In some cases, the miner ID may be based on the public key, the digital signature, or some combination thereof. The mining nodes 202 may thus be interconnected by peer-to-peer authenticated channels 206. The streaming block template messages may be exchanged over these authenticated channels 206.

Compressed Identifiers

In order to reduce the quantity of data transmitted between mining nodes in connection with streaming block templates, the transaction identifiers specified in SBT messages may be compressed. One option for compression is to truncate the transaction identifiers, such that only a portion of the identifier is transmitted. This may result in collisions between truncated identifiers. Collisions may be exacerbated in the case of 'manufactured TxIDs'; that is, there are some cases where transactions are built to ensure their TxIDs have certain characteristics, such as a certain pattern in the TxID (e.g. leading zeros). Such as case may lead to increased collisions, and, moreover, opens the possibility of attacks to cause collisions. Accordingly, it may be advantageous to provide for transaction identifier compression process other than mere truncation of the TxID.

In some cases, it may be advantageous provide for a compressed identifier structure that is extensible so as to make it incrementally collision resistant in response to transaction volume or conditions. In some cases, it may be advantageous to compress the TxID so as to try to retain as much randomness as is reasonably possible. The coding method should be common across all peer nodes so as not to have to maintain different coding processes to deal with messages from different mining nodes. Moreover, it would be advantageous to have a process that, in implementation, is capable of fast storage and lookup in a data structure that works under changing conditions.

In one aspect, the present application provides methods and systems for compressing transaction identifiers, and for identifying a full transaction identifier from a compressed identifier.

Figure 3:
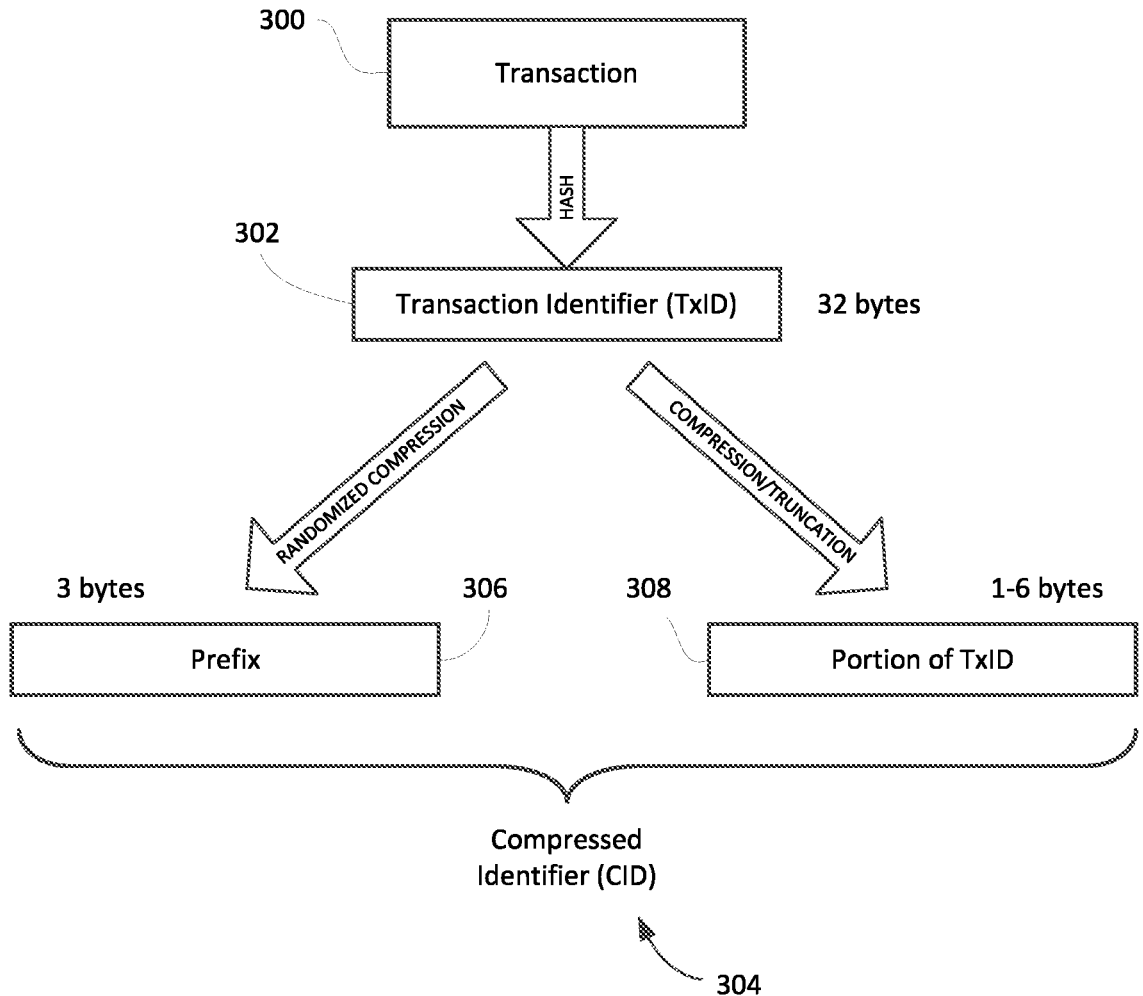
FIG. 3 shows an example construction of a compressed identifier for a transaction.

Reference will now be made to FIG. 3, which diagrammatically illustrates the structure of an example compressed identifier in accordance with the present application. In known manner, a transaction identifier 302 is generated for a transaction 300. In the example of Bitcoin, the transaction identifier 302 is obtained by hashing the transaction 300. In particular, Bitcoin prescribes a double-SHA256 hash of the transaction 300 to produce the transaction identifier 302.

The transaction identifier 302 is a fixed-length pseudo-random number. In the case of SHA256, the resulting number is a 32-byte number. A compressed transaction identifier (CID) 304 may be generated in two parts: by creating a prefix 306 and concatenating that with a truncated portion 308 of the transaction identifier 302. The prefix 306 is a fixed-length number generated using a function applied to the full transaction identifier 302. In some examples, it may be generated using a recursive hash function to produce a compact number. In some examples, the prefix 306 may be 2, 3, or 4 bytes long. The hash function used to produce the prefix 306 may be a non-cryptographic hash. The hash function may be selected on the basis of ease of computational implementation and on the basis of its randomness. Ideally, the hash function results in a prefix value that is equiprobable across its full range of potential values, i.e. it has an equiprobable distribution. The function may be one of the versions of a murmer hash function or a variation thereof.

In one example, the function involves XOR and folding operations. In some cases, the function may also or alternatively involve rotate operations. In some cases, the function may further include XOR'ing the transaction identifier with a salt value to improve randomization of any non-randomized transaction identifiers, e.g. for manufactured identifiers. The salt is a value known to all the mining nodes and may be a value recorded in the blockchain in some cases. In one example, the salt value may be a value not available before the previous block time. In one example, the salt value may be the Merkle root of the most recent block.

One example process is outlined as follow:
1. Salt XOR TxID=CID32
   {randomizes any non-random patterns in the TxID}
2. CID32[0:15] XOR CID32[16:31]=CID16 {fold CID32 into 16 bytes}
3. CID16[0:7] XOR CID16[8:15]=CID8 {fold CID16 into 8 bytes}
4. CID8[0:3] XOR CID8[4:7]=CID4 {fold CID8 into 4 bytes}
5. CID4[0:2]=$CID_{prefix}$ {truncate CID4 to first three bytes}

In some instances, one or more rotations may be introduced at various steps in the process. The resulting $CID_{prefix}$ prefix is a three-byte randomized number with a statistically equiprobable distribution.

In use, the prefix 306, such as $CID_{prefix}$, is concatenated with the truncated portion 308 of the transaction identifier. The truncated portion 308 may be a variable length portion of the transaction identifier. The length of the truncated portion 308 may be set based on a prescribed CID length parameter, cid_len, which may be set by individual mining nodes in some cases. The cid_len value may be specified by a mining node when it sends an initialization message regarding its establishment of a new block template. The cid_len value may be configured such that it specifies the length of the truncated portion 308, e.g. in bytes, such as ranging from 1 to 16. Typical length of the truncated portion 308 for a CID may be 1 to 6, in many examples. In some other cases, the cid_len value may specify the overall CID length, including the three-byte prefix 306. Experimental and modelling data indicate that an overall CID length of 4 bytes may be optimal in the case of blocks having 10 million to 500 million transactions, and 5 bytes may be optimal in the case of blocks having 500 million to 10 billion transactions. These CID lengths correspond to truncated portions 308 of 1 or 2 bytes, respectively.

Figure 4:
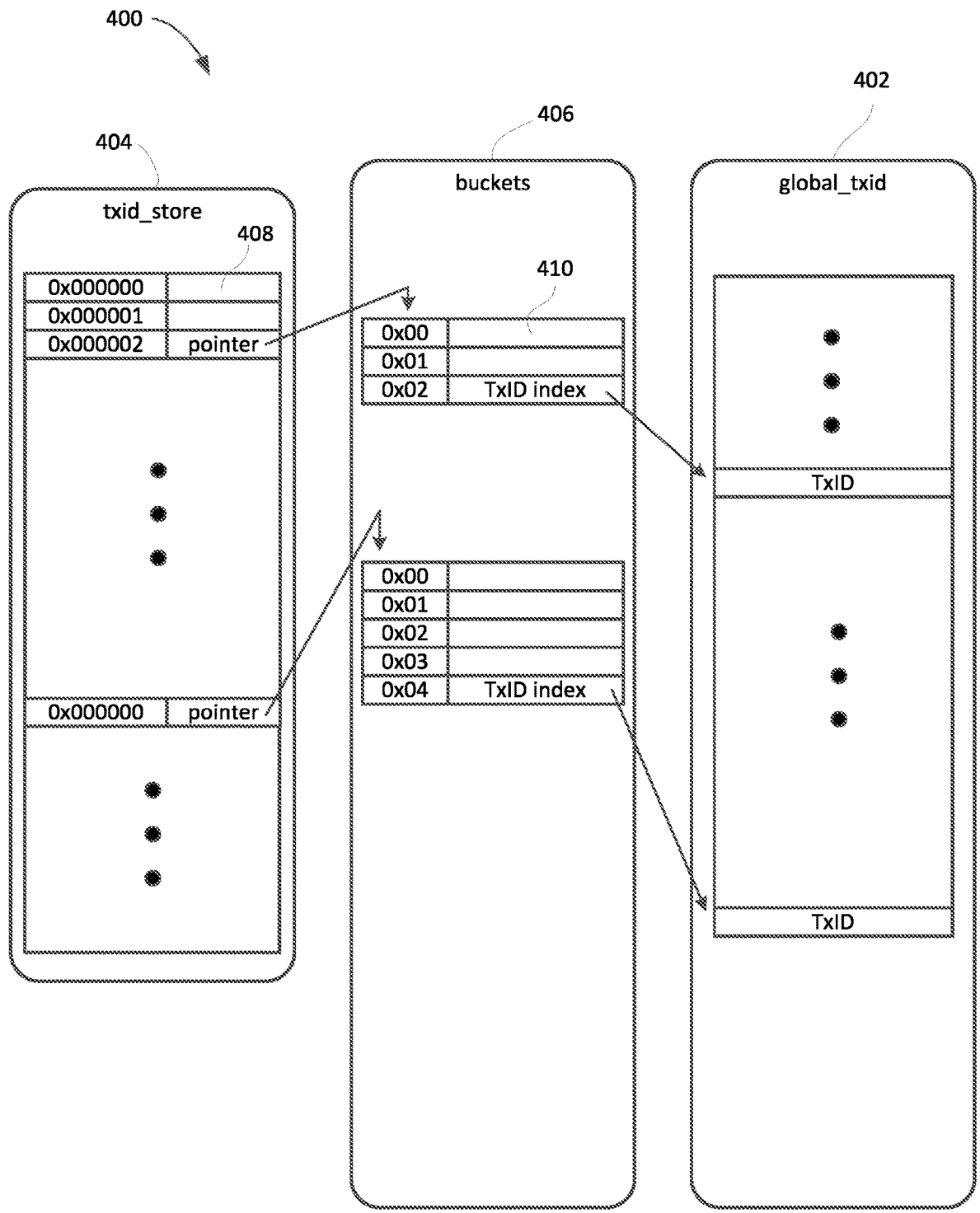
FIG. 4 shows one example of a compressed transaction identifier storage system.

Reference is now made to FIG. 4, which illustrates one example of a compressed transaction identifier storage system 400. The system 400 is for storing and quickly accessing transaction identifiers based on CDs at a mining node. The system 400 may be implemented using one memory device or multiple memory devices.

The system 400 may include a global TxID data structure 402, a TxID store index 404, and a plurality of buckets 406. The global TxID data structure 402 is a comprehensive list of transaction identifiers validated by the mining node and available for inclusion in a block, i.e. identifiers for pending unconfirmed transactions. It may be referred to herein as a global transaction identifier list. Transaction identifiers are appended to the global TxID data structure 402 in the order of arrival. As will be described below, the order of arrival may be the order in which the transaction processor transmits them to an SBT module that manages the CID generation and resolution processes, including management of the compressed transaction identifier storage system 400.

The size of the TxID store index 404 is dependent upon the length of the CID prefix. In this example, the prefix is assumed to be a three byte value. The TxID store index 404 assigns a pointer 408 to any CID prefix generated for a transaction identifier. The pointer 408 points to the location of a corresponding bucket 406 for that CID prefix. The TxID store index 404 may include sufficient memory to store respective pointers 408 for each address for the respective bucket 406 corresponding to each CID prefix.

Each bucket 406 may be a flexible sized data structure designed to contain one or more TxID indexes 410 pointing to the location (i.e. the index position) in the global TxID data structure 402 where the corresponding full TxID is stored.

In use, when a new transaction is received and validated by the mining node, it generates the TxID (if not already known) and appends the TxID to the global TxID data structure 402, noting the index at which the TxID is stored in the global TxID data structure 402. The mining node then generates a CID by generating the CID prefix using a compression process on the TxID, such as the recursive folding method described above. Once the prefix is found, then prefix is used to identify the corresponding bucket address using the TxID store index 404. The mining node then appends the TxID index 410 to that bucket 406, pointing to the location, i.e. position or index position, of the TxID stored in the global TxID data structure 402.

To resolve a received CID, the mining node finds the corresponding bucket address in the TxID store index 402 based on the prefix portion of the received CID. It then reads the TxID index(es) 410 within that bucket 406 and locates the corresponding TxIDs in the global TxID data structure 402 at the locations indicated by the TxID index(es) 410. One of those TxIDs will match the truncated portion of the CID.

Notably, the data structures in this example scale well and enable highly concurrent access.

Figure 5:
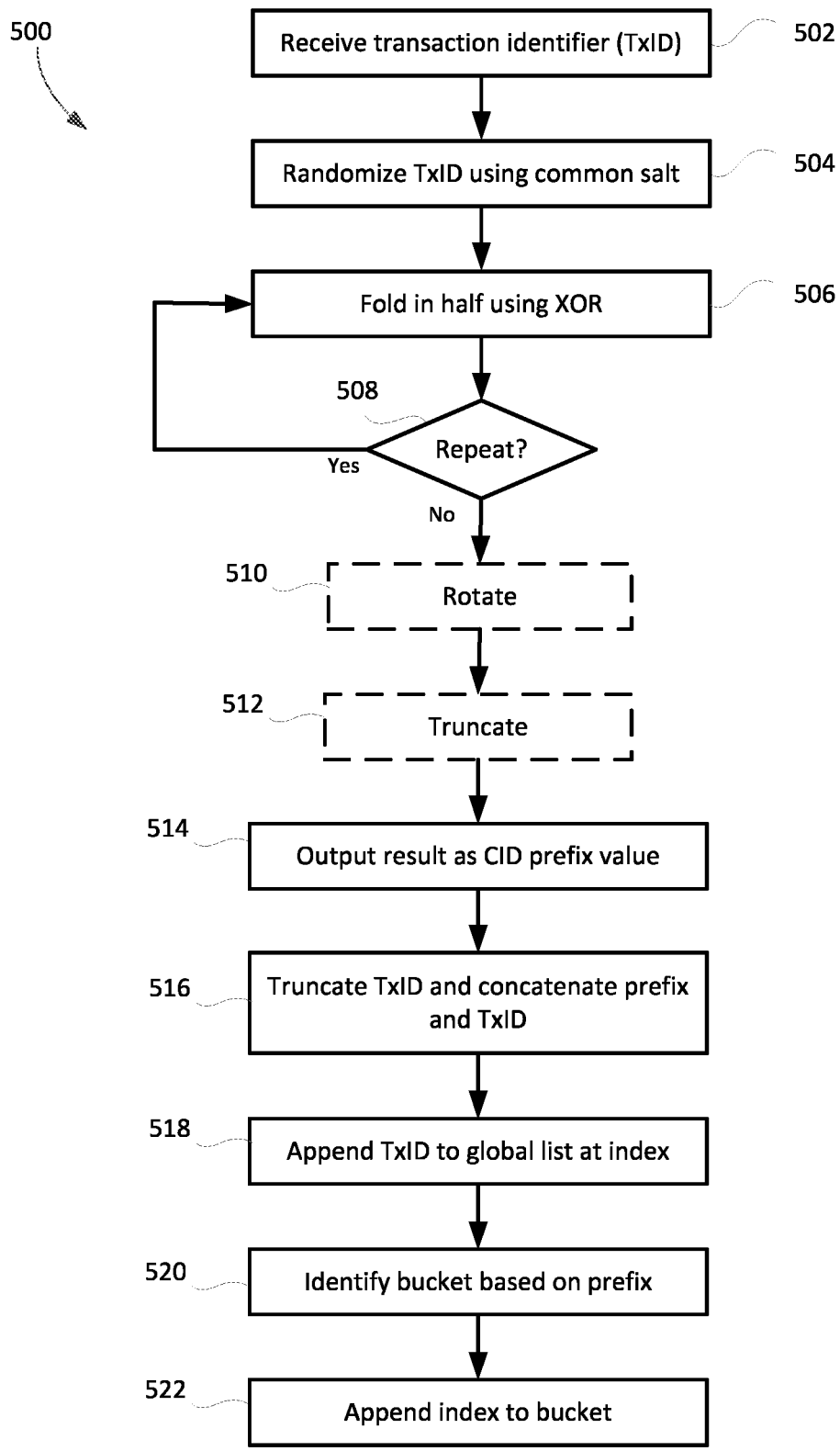
FIG. 5 shows, in flowchart form, an example method for generating a compressed transaction identifier.

Reference will now be made to FIG. 5, which provides, in flowchart form, an example method 500 for generating a compressed transaction identifier. The method 500 may be implemented by a mining node in some examples. The method 500 may be implemented by way of processor-executable instructions stored on a computer-readable medium that, when executed by one or more processors, cause the one or more processors to carry out the described functions. The instructions may be implemented as an application or module, such as an SBT module. The SBT module may be a standalone unit of software or incorporated as part of a larger suite of software routines, instructions, applications, modules, etc.

In operation 502, the SBT module receives a transaction identifier. The transaction identifier may be provided by a transaction processor within the mining node configured to validate new transactions. The transaction itself may be received via the peer-to-peer blockchain network in connection with the propagation of transactions through the network. It may be received via a merchant API from a merchant device connected to the mining node and/or to the blockchain network. The transaction identifier may have been determined by the transaction processor through hashing the transaction, which may be part of validating the transaction.

In order to generate the CID, the SBT module, in this example, randomizes the TxID by XOR'ing the TxID with a salt in operation 504. The salt may be any fixed number known to the mining nodes. In some examples, the salt may be the Merkle tree root of the most-recently confirmed block on the blockchain. The XOR'ing of a 32 byte TxID by the 32 byte Merkle root produces a 32 byte randomized TxID value.

The SBT module then, in operations 506 and 508, recursively folds the randomized TxID value using XOR operations. The recursive folding involves XOR'ing a first half of the number with a second half of the number. For example, the 32 byte value is folded by XOR'ing the first 16 bytes with the second 16 bytes. In some implementations one or both of the halves may be rotated prior to the XOR operation. The recursive folding continues until the desired length is reached. In this example, the folding occurs until the value is 4 bytes long.

Operation 510 indicates an optional rotation operation. In some cases, a rotation may be applied to the final value obtained through recursive folding. Operation 512 indicates an optional truncation operation. In some cases, only a portion of the final value obtained through recursive folding is retained. In this example, only the first three bytes of the folded value is retained. The result is then output as the CID prefix in operation 514.

In this example method 500, the CID generation process then further includes truncating the transaction identifier, as indicated by operation 516, and concatenating the prefix and the truncated TxID. The TxID may be truncated to a length determined based on the prescribed CID length, as reflected by the cid_len parameter. Operation 516 results in generation of the CID, which may then be used to signal to other mining nodes that the associated transaction has been included in a candidate block by the current mining node.

The method 500 further includes storing the CID mapping, as indicated by operations 518 to 522. In particular, in operation 518, the SBT module stores the TxID in the global_list and notes the location (e.g. index) at which the TxID is stored. In operation 520, it then identifies the bucket associated with the CID prefix generated for the TxID. The index to the global_list is then appended to that bucket in operation 522.

It will be appreciated that other operations may be carried out in connection with the receipt of a new TxID by the SBT module, such as appending the TxID to the append-only list (AOL) for the current mining node, reflecting the contents of the candidate block built by the current mining node, or the inclusion of the CID in an append message sent to other mining nodes.

Figure 6:
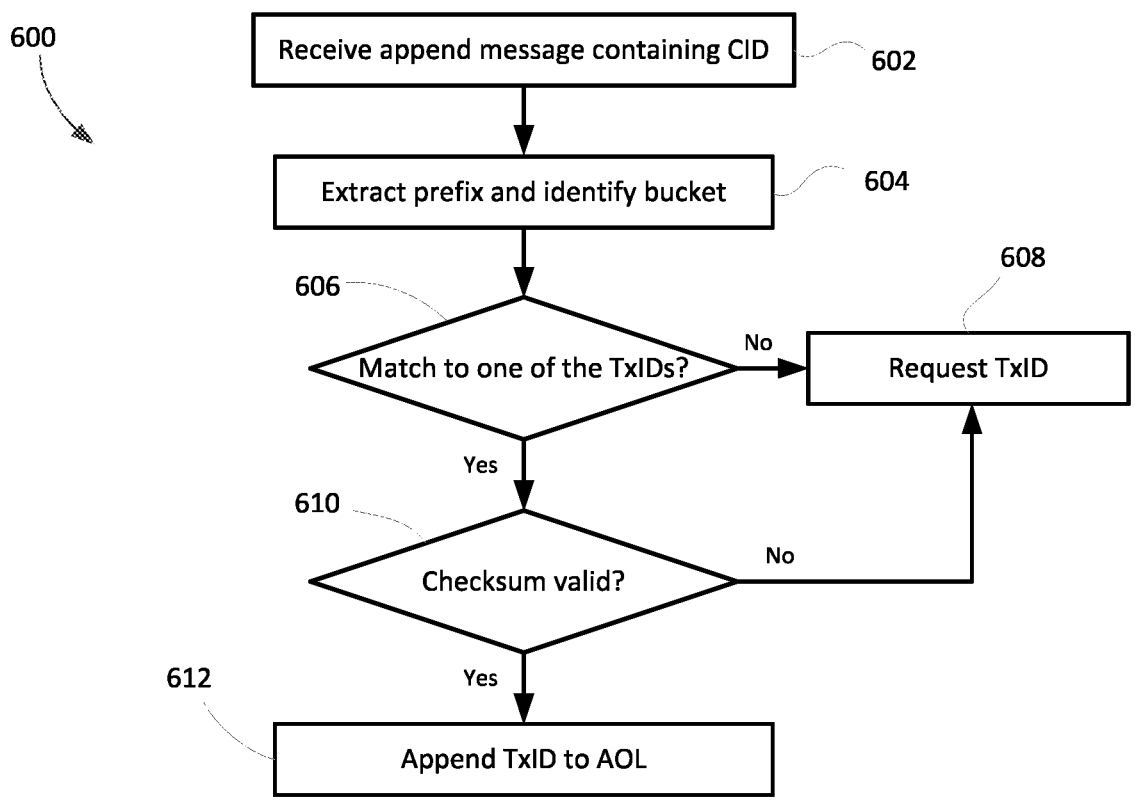
FIG. 6 shows, in flowchart, form, an example method of updating an append-only-list stored at a first mining node.

Reference is now made to FIG. 6, which shows a flowchart illustrating an example method 600 of updating an AOL stored at a first mining node. The first mining node receives an append message from a second mining node in operation 602. The append message includes an ordered set of CIDs. As will be explained further below, in some cases, the append message may include one or more extended CIDs or even full TxIDs if the sending mining node determines that a longer CID or full TxID would be advantageous to avoid collisions.

The receiving mining node extracts the prefix portion of the received CID in operation 604 and the prefix is used to identify the corresponding bucket in the TxID store. In one example, the prefix portion is the first three bytes. As described above, the bucket contains one or more indexes pointing to locations in the global TxID data structure at which TxIDs are stored that correspond to that prefix. In operation 606, the TxIDs at which the index(es) point are read to find one that matches to the remainder of the CID, i.e. to the truncated portion. That is the first portion of the TxID will match the remaining part of the CID. If no match is found, or if the bucket does not contain any indexes, then in operation 608 the receiving mining node may message the sending mining node to resolve the missing transaction data. For example, the message may request the full TxID or the full transaction that corresponds to the CID.

If matches are found in operation 606, then in operation 610 a checksum in the append message may be validated. In some example implementations, the append message may include a checksum or another error detection mechanism for determining whether the resolved set of transaction identifiers obtained from the CIDs in the append message are accurate or not. If it fails, it may indicate an undetected collision that requires resolution. As a result, the receiving mining node may message the sending mining node regarding the failed checksum and requesting collision resolution, as indicated by operation 608. If the checksum is validated, then in operation 612 the receiving mining node appends the transaction identifiers to the AOL stored in memory for the sending mining node. In one implementation, a single checksum value is provided for the ordered list of all transaction identifiers referenced in an append message. In another implementation, a checksum value is provided for each transaction identifier referenced in an append message. In yet another implementation, a checksum value is provided for each group of X number of sequential transaction identifiers in the order referenced in the append message. The size of the groups, X, may be set by the blockchain protocol or may be configured by the mining node during initialization.

As mentioned above, the CID length may be a fixed value. The fixed value may be prescribed in a network protocol and hard coded in some cases. In some cases, it may be a predetermined network parameter selected by consensus of the mining network. In some cases, it may be based on a length selected by a mining node when the mining node sends an SBT initialize message signalling it is participating in the SBT network and has a candidate block that it will signal.

The optimum length for balancing bandwidth usage with collision probabilities may change with changes in the volume of transactions. It may be advantageous to provide for a graceful mechanism for adjusting the length of CIDs as conditions demand. In one example, the default CID length may be set by the CID length parameter, cid_len, but the protocol may permit signalling transaction identifiers using a longer CID if a collision is identified by the sending node. In some implementations, two or more adjustments to CID length may be made to gradually adjust length to avoid collisions on a case-by-case basis. In some cases, a full TxID or even the full transaction may be sent in an append message.

To signal the type of reference being sent, different opcodes may be defined for different types of references. For example, the opcode OP_APPEND_CID may be defined for signalling a compressing transaction identifier of length cid_len bytes. A further opcode, OP_APPEND_ECID, may be used to signal that an "Extended CID" will be appended, which has a length of (cid_len+1) bytes, i.e. it is one extra byte longer than the CID. That is, the truncated portion of the ECID is one byte longer than the truncated portion of the CID.

In some cases, another opcode, OP_APPEND_XCID, may be defined to signal a "further eXtended CID", for cases where the ECID cannot resolve a collision. The XCID may have a length of, for example, (cid_len+4) bytes, i.e. 3 bytes longer than the ECID and 4 longer than the CID. In the very rare cases where the ECID cannot resolve a collision, there may be the possibility of sending a full TxID, using the opcode OP_APPEND_ID, which indicates that the data that follow is a full 32-byte TxID.

In some cases, such as where the miner receives a transaction directly injected from a Merchant API instead of over the peer-to-peer blockchain network, it may choose to send that transaction in full within an append message (in addition to propagating it on the peer-to-peer network) on the expectation that the receiving mining node likely has not yet seen the propagated message via the peer-to-peer network. An opcode OP_APPEND_FULL may be defined for such a situation, which may be followed by a value indicating the length of the subsequent transaction data, and then the transaction data in full.

Figure 7:
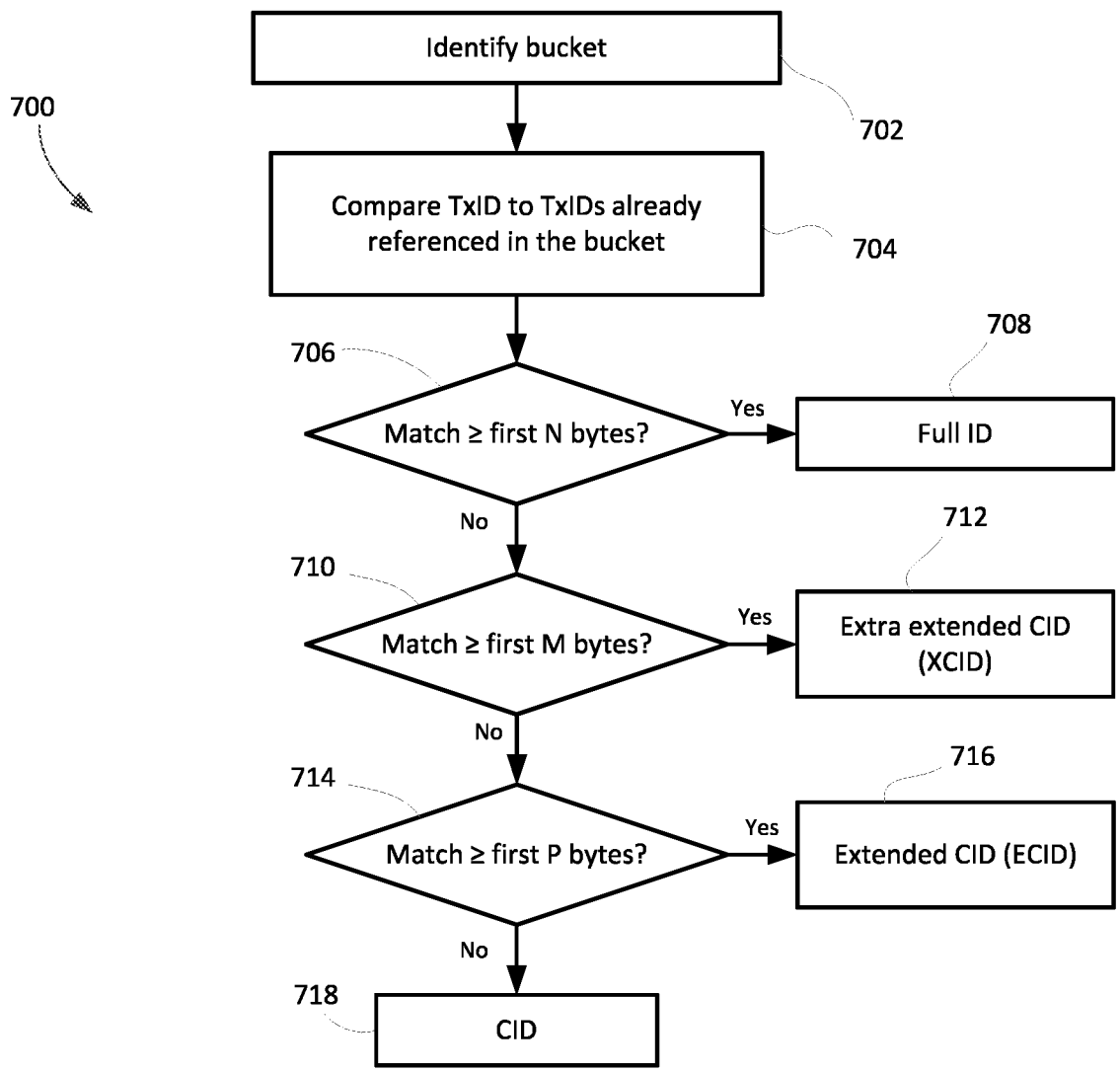
FIG. 7 shows, in flowchart form, another example method for generating a compressed transaction identifier.

Reference is now made to FIG. 7, which shows a flowchart illustrating one example method 700 of generating a compressed transaction identifier. The method 700 may be implemented by a suitably programmed computing device, such as mining node. It may be presumed that the mining node has a TxID for a validated transaction and that the mining node has generated the prefix portion of the CID. The prefix portion may be generated using a recursive compression method, such as the recursive folding method described in connection with FIG. 5, for example.

In operation 702, the mining node identifies the bucket that corresponds to the prefix generated for the TxID. This may include identifying the pointer to the address of the bucket stored in association with the prefix in a txid store data structure. The mining node then compares the TxID to the TxIDs already referenced in the bucket, as indicated by operation 704. That is, the bucket may already contain one or more TxID indexes pointing to locations in the global TxID data structure at which TxIDs having the same prefix are stored.

In operation 706, the mining node assesses whether one of the TxIDs referenced by the bucket matches with at least the first N bytes of the current TxID. N may be a value set by the CID length parameter cid_len, such as N=cid_len+1. That is, N may match the prescribed length of an XCID less the three-byte length of the prefix, i.e. N matches the length of the truncated portion of an XCID. If an existing stored TxID matches the first N bytes of the current TxID, then in operation 708 the mining node determines that a full ID is to be sent. Accordingly, an OP_APPEND_ID opcode is used to add the full TxID to an append message.

If there is no such match, then in operation 710 the mining node assesses whether at least M bytes of the current TxID match one of the TxIDs referenced in the bucket, where M<N. In some instances M corresponds to the length of the truncated portion of an ECID, e.g. cid_len−2. If so, then in operation 712 the mining nodes determines that an XCID should be sent, e.g. with an overall length of cid_len+4, i.e. having a truncated portion of the TxID with a length of cid_len+1 bytes. Accordingly, an XCID is assembled from the prefix and the first cid_len+1 bytes of the TxID, and an OP_APPEND_XCID opcode is used to add the XCID to the append message.

If there is no such match, then in operation 714 the mining node assesses whether at least P bytes of the current TxID match one of the TxIDs referenced in the bucket, where P<M<N. In some instances P corresponds to the length of the truncated portion of a CID, e.g. cid_len−3. If so, then in operation 716 the mining nodes determines that an ECID should be sent, e.g. with an overall length of cid_len+1 where the truncated portion is of length cid_len−2. Accordingly, an ECID is assembled from the prefix and the first cid_len−2 bytes of the TxID, and an OP_APPEND_ECID opcode is used to add the ECID to the append message.

If no matches are found in operations 706, 710, or 716, or if there are no TxIDs referenced in the bucket yet, then in operation 718 the mining node generates a CID using the prefix and the first cid_len−3 bytes of the TxID. It then uses an OP_APPEND_CID opcode to add the CID to the append message.

It will be appreciated that although this example process uses three possible compressed ID lengths (CID, ECID, XCID) other implementations may have more possible lengths or fewer possible lengths. Moreover, the lengths of the CID, ECID, and XCID values in these examples are one example set of lengths. Different lengths may be used in other implementations. The above-described process adapts the length of the compressed identifier gradually to address detected collisions and adapt to large transaction volume situations.

The above-described methods and systems provide various options for streaming block template data between mining nodes to enable pre-solution block template propagation. The use of compressed transaction identifiers enables reduced bandwidth usage. The described example processes for generating compressed transaction identifier assist in detecting and resolving collisions before they occur through elegant adaptable extension of the compressed identifier. The structure of the compressed identifiers, with a prefix constructed to have a generally equiprobable distribution, and the structure of the data model for storing data to decompress/resolve CIDs, provide resiliency to attack vectors and enable fast highly concurrent memory access for resolving CIDs.

It would be advantageous to further exploit options for signalling transaction identifiers in a bandwidth-efficient manner. Accordingly, in another aspect, the present application provides methods and systems for signalling transaction identifiers that exploit the fact that the mining nodes participating in the SBT network are building a generally common picture of the AOLs of other mining nodes. Most those AOL lists are being built from the same overall set of unconfirmed transactions. Therefore, in one aspect, a mining node may reference a transaction identifier in its own AOL using a pointer to that same transaction identifier in another mining node's AOL.

Figure 8:
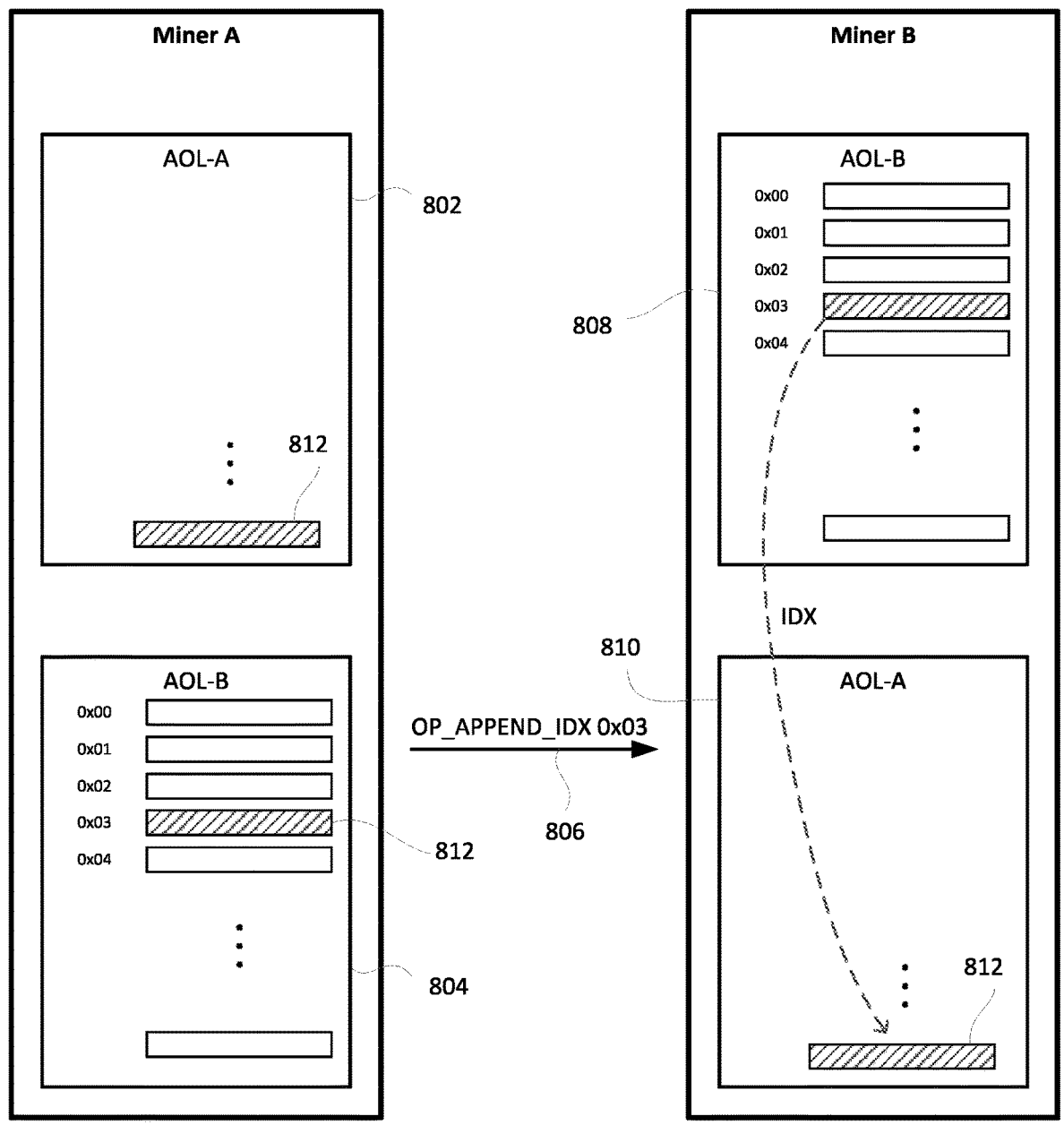
FIG. 8 shows, in block diagram form, a simplified example system including two mining nodes using an IDX reference.

FIG. 8 diagrammatically illustrates a simplified example system including two mining nodes: miner A and miner B. Miner A has an AOL-A list 802 reflecting the ordered list of transactions added to its current candidate block, and an AOL-B list 804 reflecting the ordered list of transactions that miner B has told it are included in miner B's candidate block. It builds the AOL-B list on the basis of append messages received from miner B over an authenticated connection 806 between the two miners.

Miner B similarly maintains its own AOL-B list 808 reflecting the ordered list of transactions in its candidate block and an AOL-A list 810 reflecting the ordered list of transactions that miner A has told it are included in miner A's candidate block.

As described above, the append messages that the miners use to signal to each other the ordered list of transactions in their respective AOLs may use opcodes such as OP_APPEND_CID, OP_APPEND_ECID, OP_APPEND_XCID, or OP_APPEND_ID, to signal the transaction identifiers in the ordered list. However, if miner A is signalling inclusion of a particular transaction identifier 812 in its AOL-A list 802, and it has already entered that same particular transaction identifier 812 in the AOL-B list 804 based on append messages from miner B, then miner A has the option of specifying that particular transaction identifier to miner B by pointing to miner B's AOL-B list 804. Specifically, miner A may denote the index of that particular transaction in the ordered set of transactions that makes up the AOL-B list 804. In this example, the index may be 0x03.

Accordingly, when building an append message to be sent to miner B, miner A may choose to use OP_APPEND_IDX 0x03 instead of another opcode referring to a compressed transaction identifier. Upon receipt of the append message, when miner B encounters the OP_APPEND_IDX opcode, it knows that the index specified is an index to its own AOL-B list 808. It may then copy the contents, i.e. the TxID, at that index from its AOL-B list into the AOL-A list 810. In this example, the TxID at index 0x03 of the AOL-B list 808 is appended to the AOL-A list 810.

This manner of signalling transaction identifiers may result in bandwidth savings in cases where signalling an AOL index value is more efficient than signalling a compressed transaction identifier, particularly if the compressed transaction identifier is an extended or further extended or full transaction identifier.

Figure 9:
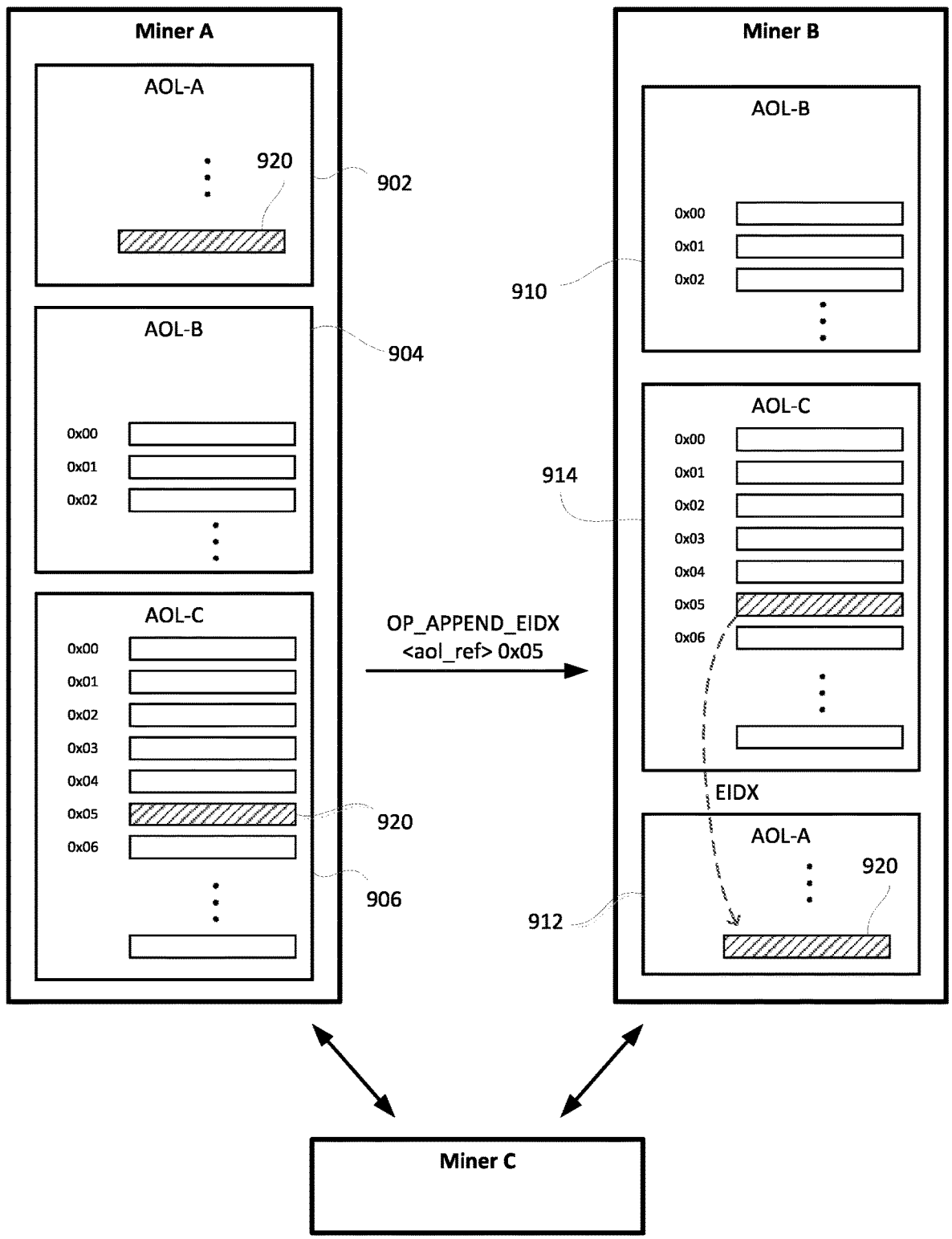
FIG. 9 shows, in block diagram form, another simplified example system including three mining nodes using an EIDX reference.

The concept of specifying a transaction identifier by signalling an index to an AOL may be extended to a multi-miner situation in which one miner may signal a transaction identifier to a second miner by providing an index to a third miner's AOL. FIG. 9 illustrates this situation involving miner A, miner B, and miner C. Miner A maintains its own AOL-A list 902, an AOL-B list 904 for miner B, and an AOL-C list 906 for miner C. The AOL-C list 906 is constructed by miner A based on append messages received from miner C. Similarly, miner B stores its own AOL-B list 910, an AOL-A list 912 for miner A, and an AOL-C list 914 for miner C.

If miner A intends to send an append message to miner B specifying a TxID 920 in its AOL-A list 902, and it knows that the same TxID 920 appears in the AOL-C list 906 for miner C, then it may send an append message specifying AOL-C list 906 and specifying an index, e.g. 0x05, to that list. Miner B, on receiving the append message and encountering this reference, may then locate the TxID within its own copy of the AOL-C list 914 at the specified index, e.g. 0x05. It then copies that TxID and appends it to its AOL-A list 912.

A third-party index reference opcode, OP_APPEND_EIDX, may be defined to specify indexes to third-party AOL lists. The OP_APPEND_EIDX includes both the index and a reference to the AOL list and/or associated miner. In this sense, it is less efficient than the OP_APPEND_IDX due to the inclusion of the additional data, but may nonetheless result in bandwidth savings over CID, ECID, XCID, and/or ID signalling, in some cases.

The reference to the AOL list that is included in the append message may be a reference to the third party miner in some cases, e.g. miner ID, although this would not permit reference to a specific template but rather would be interpreted as a reference to a then-current template for that third party miner. As templates may be re-initialized if a new candidate block is started, even within a block time, it may be advantageous to reference the template itself.

The templates each have a streaming block template identifier, sb_template_id, used when sending an initialization message. The sb_template_id is unique among current templates, and in combination with sequence numbers applied to each append message, permits receiving nodes to properly order append messages and apply them to update the correct template. Accordingly, the OP_APPEND_EIDX operation may reference the sb_template_id number to ensure the index is used to locate a TxID in the correct template.

In order to make OP_APPEND_EIDX efficient, it may be advantageous to use a more compact form of the SB template identifier. If it is assumed that there will only be tens to hundreds of templates at any one time, the compact form of the SB template identifier may be obtained by truncating it to a fixed shortened number of bytes, such as 2 bytes. The shortening may be through truncation, a truncated hash, a murmer hash, or any other such mechanism. In some implementations, a miner initializing a new template and selecting a new SB template identifier first tests whether the compact form of the SB template identifier conflicts with any current templates of which it is aware and, if so, it selects a new SB template identifier and tests the compact form of the new SB template identifier for conflicts.

In testing with blocks containing about a billion transactions, in at least one model environment, it has been found that IDX and CID may result in similar average message sizes. CID may be more slightly more efficient. IDX may be selected if it would otherwise be necessary to use ECID or XCID. ECID may be more efficient than EIDX. It may be advantageous to select EIDX, if available, in preference to XCID or D.

As indicated above, the SBT process may involve sending or broadcasting an initialization message on the SBT network specifying an SB template identifier for the sending mining node. That mining node may receive initialization messages from other mining nodes indicating their respective SB template identifiers and, on receiving those messages, the mining node prepares to build a corresponding AOL list for each one. The initialization message may set certain parameters relating to that mining node's AOL list. For example, it may specify the miner ID, an SB template identifier, and the CID length (cid_len) used by the mining node. In some cases, it may include miner public key information and a miner signature. In some cases, it may specify a checksum group size, which is the number of transactions in a group over which checksums will be performed and provided when sending append messages. This value may also be specified in individual append messages, in some implementations. In some cases, the initialization message may include the previous block hash so that the recipient can validate that the message relates to a candidate block relevant to a current mining window.

The initialization message may further specify the other mining nodes from which the current mining node has received SB template data, like initialization messages and append messages. In other words, the initialization message may signal which AOL lists the current mining node is tracking. This enables other mining nodes to know whether they can use EIDX signalling with the current mining node that references a particular third party mining node's AOL list. In some cases, a mining node update its AOL tracking data in subsequent append messages to signal that it is tracking AOL information for additional mining nodes. In one example, the mining nodes signals that it is tracking AOL information for particular other nodes by listing the SB template identifiers for those other nodes in its initialization and/or append messages as third party templates it is building.

After sending an initialization message, the mining node may send one or more append messages specifying the ordered list of transactions in its then-current candidate block. Each successive append message sent by a mining node in connection with the same template contains the template identifier and a sequence number. In that manner, mining nodes that receive or process the append messages out of order may ensure they are processed in the correct order to build the AOL list and/or to identify any missing append messages in the sequential order.

The append messages may each include a template identifier, a sequence number, a transaction count indicating the number of references in the message. After the block of AOL data, i.e. the references to the CIDs, IDXs, etc., the message may include one or more checksum values. In some cases, it may include a checksum group size parameter specifying how many resolved transaction identifiers are grouped together for the purpose of performing and evaluating a checksum. In some cases, there may be one checksum for all resolved transaction identifiers. In some cases, they may be partitioned into smaller groups of transaction identifiers with a checksum value for each group.

If a POW solution is found, i.e. the mining node solves the POW for a version of its candidate block, then it sends a finalization message, sbt_finalize, on the SBT network advising the other mining nodes that it has found a solution and providing the solution specifics. The sbt_finalize message may include, for example, the complete block header, coinbase (generation) transaction, etc. It may further include data enabling synchronization of the AOL list to the candidate block, as will be explained further below.

Figure 10:
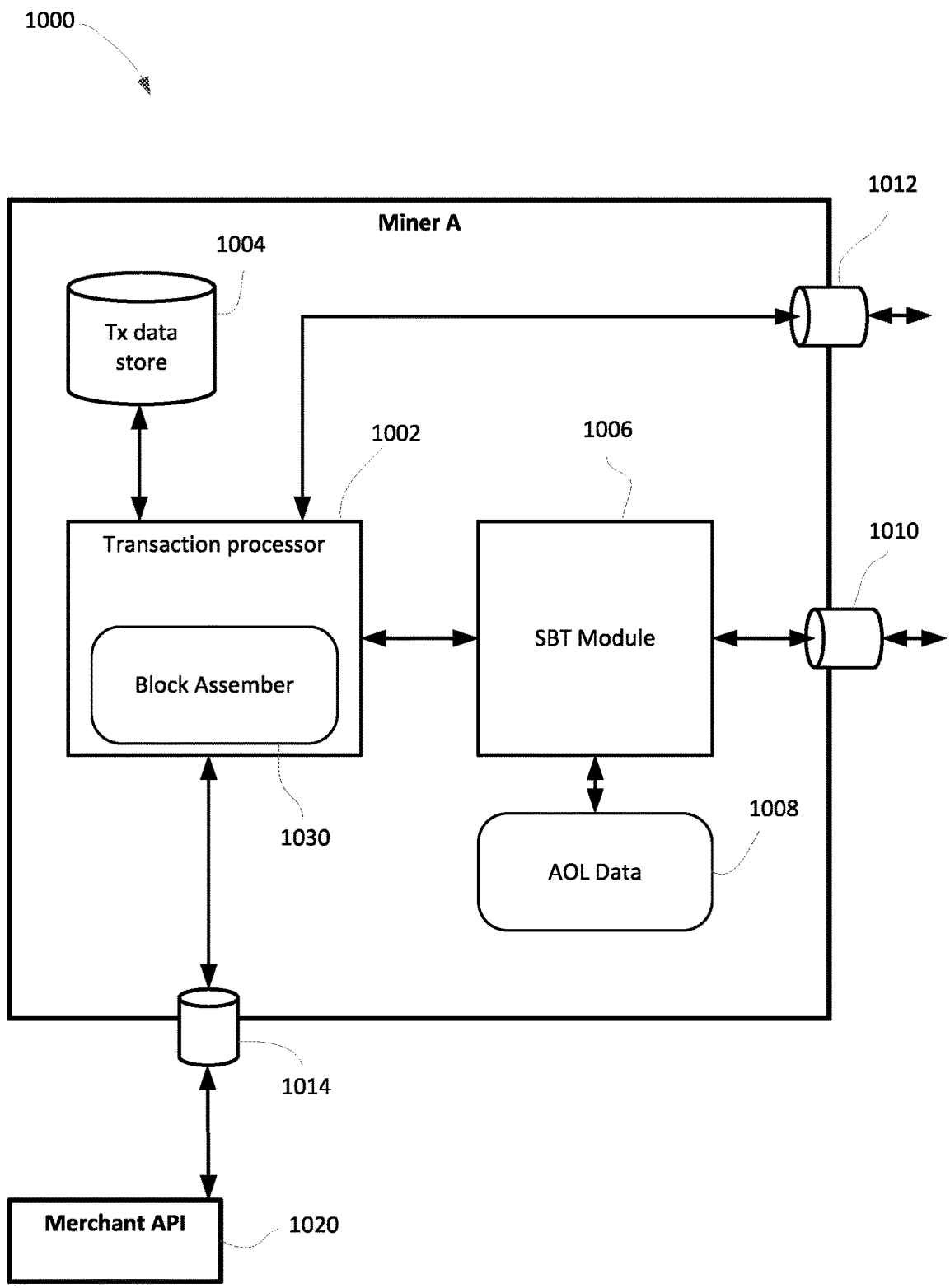
FIG. 10 shows, in block diagram form, an example mining node.

To appreciate the synchronization issue, it may be advantageous to consider the operation of various parts of an example mining node. FIG. 10 shows, in block diagram form, a simplified example of a mining node 1000. The mining node 1000 in this example includes a transaction processor 1002 configured to receive and validate new transactions, and store them in a transaction data store 1004. The transaction data store 1004 may be local or may be located remotely and connected to the transaction processor 1004 by way of one or more network connections.

The mining node 1000 further includes an SBT module 1006 configured to construct CIDs, ECIDs, XCIDs, and the various messages, including append messages to be sent over the SBT network to other mining nodes. The SBT module 1006 is further configured to receive append messages from other mining nodes and to build corresponding AOLs 1008 stored in local memory. The SBT module 1006 may be further configured to determine whether to replace CIDs, ECIDs, XCIDs, or IDs with IDX or EIDX references in particular circumstances where use of an IDX or EIDX reference would be advantageous.

The SBT module 1006 sends and receives communications over the SBT network via authenticated connections 1010 with other mining nodes. The transaction processor 1002 may send and receive peer-to-peer messages with other nodes over a network connection 1012 with the blockchain network.

Transaction data may be received by the mining node 1000 from three sources. Transactions may be received via the network connection 1012 to the blockchain network in accordance with the propagation of transactions as governed by the applicable blockchain protocol. Such transactions are validated by the transaction processor 1002, stored in the transaction data store 1004 and, if applicable, further propagated to other nodes on the blockchain network via the network connection 1012.

Transactions may be received via the SBT network over one of the authenticated connections 1010 to another mining node. Such a transaction may be received in full form from that other mining node, particularly if the other mining node knows that the transaction has not yet been generally propagated on the blockchain network. The SBT module 1006 transfers the full transaction data to the transaction processor 1002 to be verified and stored in the transaction data store 1004.

Transactions may also be received by the mining node 1000 via a merchant API 1020 through a merchant connection 1014. The merchant API 1020 may, for example, be associated with a point-of-sale device or payment processing gateway or the like, and may enable direct injection of a newly-generated transaction to the mining node 1000 for validation and propagation.

Figure 11:
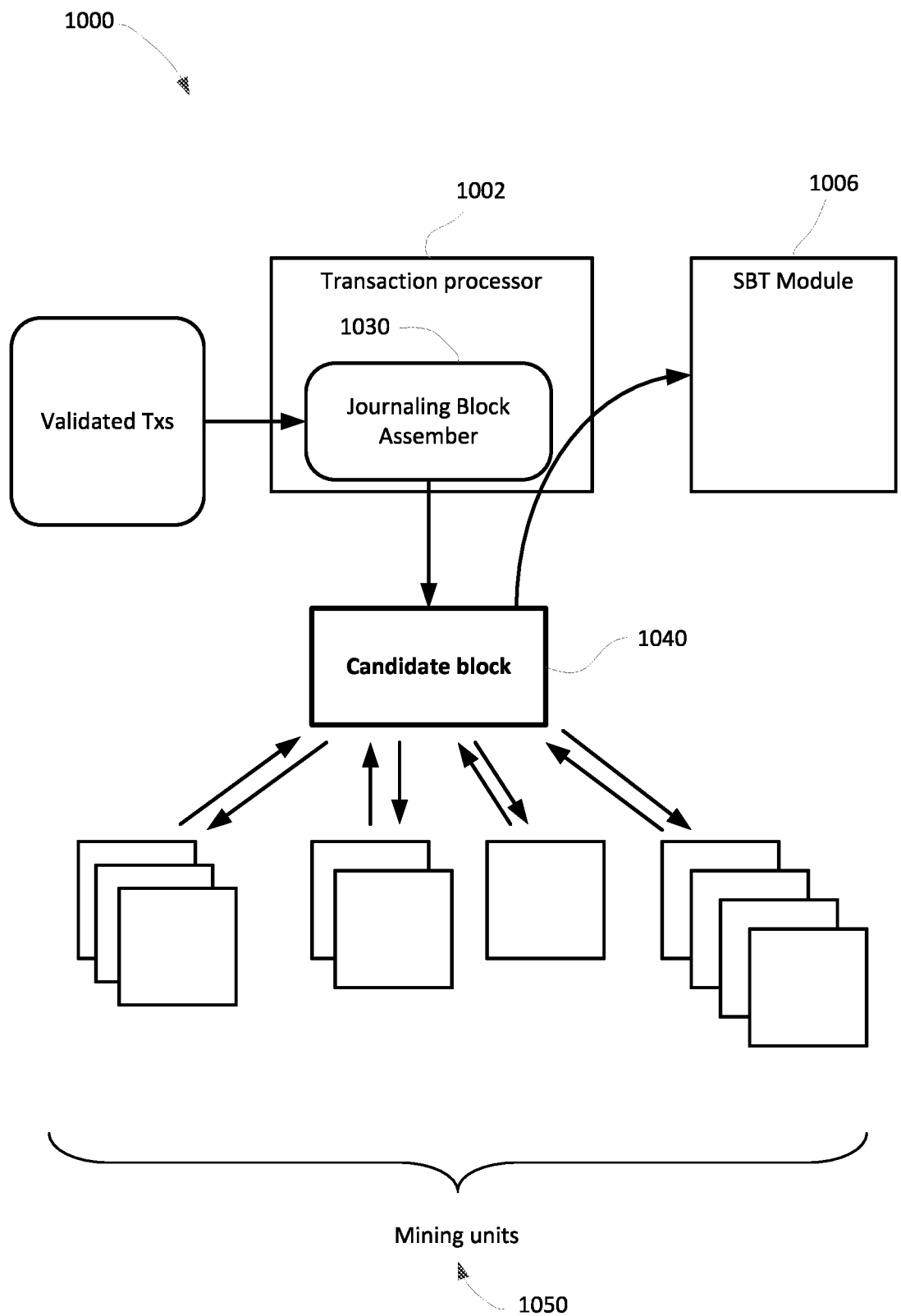
FIG. 11 shows candidate block assembly and distribution in the context of the example mining node.

The transaction processor 1002 may further include a journaling block assembler 1030 configured to build a candidate block. The candidate block includes an ordered set of validated transactions from the transaction data store 1004. Reference is now also made to FIG. 11, which diagrammatically illustrates candidate block assembly and distribution.

The mining node 1000 may include a plurality of mining units 1050 configured to perform the calculations to search for a POW with regard to a given candidate block 1040. In some cases, those mining units 1050 are within the mining node 1000. In some cases, some or all of those mining units 1050 may be external to the mining node 1000, such as where the mining node 1000 acts as a pool coordinator for a mining pool.

The journaling block assembler 1030 may be configured to add transactions to the candidate block 1040 over time as they are received and validated by the transaction processor 1002. In some implementations, this may result in the journaling block assembler 1030 creating a new or updated candidate block periodically. In some examples, a new candidate block is assembled approximately every $1/10^{th}$ of a second.

A mining unit 1050 may request a new candidate block once it has failed to find a solution to a candidate block upon which it was working. The journaling block assembler 1030 may then respond by providing them with the then-current assembled candidate block 1040. Accordingly, different mining units 1050 may be working on different "versions" of the candidate block 1040 depending on when they obtained it from the journaling block assembler 1030. Each "version" may have an associated candidate block identifier.

Likewise, in a somewhat asynchronous manner, the transaction processor 1002 and, in some cases, the journaling block assembler 1030 specifically, may provide updated candidate block information to the SBT module 1006. The SBT module 1006 then builds the appropriate append message to update other mining nodes as to the candidate block being tested by the mining node 1000. In some cases, the SBT module 1006 may receive candidate block data regarding added transaction on a free-running basis from the journaling block assembler 1030 and may build an append message based on that incoming information until such time as the incoming information is marked with a new candidate block identifier. Once the SBT module 1006 detects a new candidate block identifier, it closes out and sends the draft append message and starts a new one using the new transaction data associated with the new candidate block identifier. In this manner, each append message corresponds to a candidate block identifier, which will make subsequent synchronization easier.

When a mining unit 1050 identifiers a POW solution, it notifies the transaction processor 1002, which then informs the SBT module 1006 that a POW solution was found and provides the associated candidate block identifier. It will be appreciated that because the mining units 1050 are not all necessarily working on the current candidate block in a synchronous manner, the SBT module 1006 may have been running ahead of some of the mining units 1050 in terms of the append messages generated and sent. Accordingly, the SBT module 1006 identifies which append message matches to the candidate block identifier that has been solved. Recall that append messages each have a template identifier, sb_template_id (which is constant for a block time), and a sequence number. Once the SBT module 1006 determines which sequence number is associated with the candidate block identifier, it can determine whether synchronization is required. If synchronization is required, then it takes action to instruct the other mining nodes to update their AOL list for the mining node 1000 to roll-back one or more append operations.

In one example, the synchronization roll-back may be implemented by sending the other mining nodes the sequence number that corresponds to the candidate_block in the finalize message. The other mining nodes may then unwind any appends that occurred due to append messages having subsequent sequence numbers, in order to arrive at the AOL that matches the solved candidate block.

In another example, the synchronization roll-back may be implemented by inserting OP_DELETE operations into the finalize message that specify the deletion of all transactions appended after a certain index indicated in the OP_DELETE message.

Figure 12:
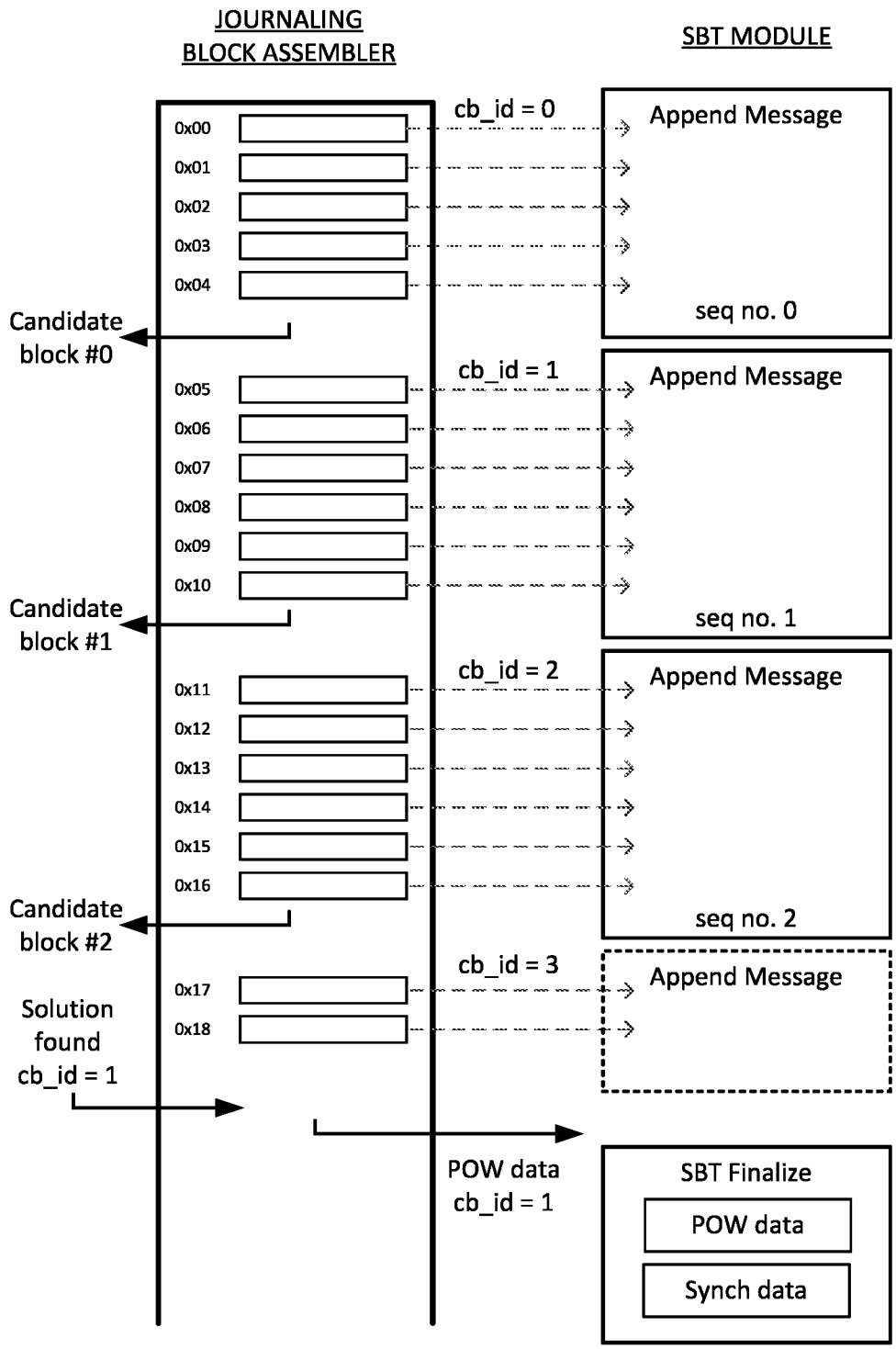
FIG. 12 graphically illustrates the parallel processes of candidate block updates and streaming block template communications for a mining node.

Reference will now also be made to FIG. 12, which graphically illustrates the parallel processes of candidate block updates and SBT communications for a mining node. On the left side of the diagram, is a first version of a candidate block formed by the journaling block assembler. The first version is formed as the assembler adds validated transactions to the candidate block in an order. Those transactions, and in some cases their index (e.g. location/order) in the candidate block are relayed to the SBT module. The passing of that transaction data to the SBT module is in messages tagged with a candidate block identifier, e.g. candidate_block_id. In one example, the identifier is designated cb_id for ease of reference. In this simplified example, the cb_id is initially set to zero, such that each transaction in the first version relayed to the SBT module is in a message that specifies cb_id=0.

The SBT module adds the received transaction data to a draft append message as it is received, thereby building an append message for transmission. It will be appreciated that the append message may include CIDs, ECIDs, or XCIDs rather than the full TxIDs. In some cases, it may include IDX or EIDX references; although in some implementations, it may be left for the SBT module to determine later whether the replace CID, ECID, XCID, or ID references with IDX or EIDX references before transmitting the message to a particular miner.

At some point, the journaling block assembler completes assembly of the current candidate block. This may be triggered periodically, e.g. every $1/10^{th}$ of a second, or may be triggered in response to a request from a mining unit for a new block. In some cases, the initial version of the candidate block is assembled and sent as soon as the journaling block assembler has completed it using currently available transactions and it then adds additional validated transactions as they are validated and stored by the transaction process, and new 'versions' of the candidate block are marked each time the evolving candidate block is sent to a mining unit in response to a request from that mining unit for a candidate block to mine.

Irrespective of how the journaling block assembler determines when the candidate block version changes, each time it changes, the subsequent transaction relayed to the SBT module is marked with the updated candidate block identifier. In the illustrated example, when the transaction at index location 0x05 is relayed to the SBT module it is in a message that includes cb_id=1. Accordingly, on receipt of that message, the SBT module determines that the candidate block version has changed (from 0x00 to 0x01). As a result, it finishes the draft append message and transmits it, without adding the new transaction yet. It then opens a new draft append message, with the next sequence number, and adds the transaction that is at index 0x05 in the candidate block to the new draft append message. It may also update the local AOL stored in memory for this mining node, to track the current state of the candidate block.

This process continues, as illustrated, with the SBT module closing and sending an append message each time it discovers from relayed transactions from the journaling block assembler that the candidate block identifier has been incremented. If one of the mining units finds a solution, it returns the solution to the transaction processor together with the candidate block identifier for the candidate block for which it found a solution. This is not necessarily the current candidate block identifier, since that may have been updated one or more times since the mining unit was provided with the candidate block version upon which it was working. Accordingly, with the candidate block identifier, the journaling block assembler may determine which version of the candidate block has been solved.

The solution and its associated candidate block identifier are also relayed to the SBT module. The SBT module then determines which append message was associated with the solved candidate block, i.e. which append message was sent once that candidate block identifier was incremented. For example, using the process illustrated, if the candidate block identifier for the solved block is cb_id=1, the candidate block contains the ordered set of transactions spanning indexes 0x00 to 0x10. The SBT module then identifies that the append messages with sequence numbers 0 and 1 match the candidate block, but that append message sequence number 2 and draft (but unsent) append message sequence number 3 are not part of the solved candidate block.

Accordingly, the SBT module prepares and sends an SBT finalize message, e.g. sbt_finalize, which notifies the other mining nodes that a solution was found, provides the solution data (e.g. the block header data, the coinbase transaction, etc.), and provides synchronization data. In one example, the synchronization data may be the sequence number of the last append message that corresponds to the solved candidate block. The receiving mining nodes then identify whether they have updated the corresponding AOL list with append messages having later sequence numbers, and they unwind those appends to ensure the AOL list matches the contents of the solved candidate block. They can then assemble the completed block using the solution data from the SBT finalize message and validate the block solution.

Alternatively, the synchronization data may be one or more explicit delete opcodes specifying the transactions to be removed from the AOL list in order to unwind previous append operations. The delete opcode may be a single opcode for the oldest append that needs to be removed, with the understanding that all subsequent appends must also be removed, or a delete opcode may be included for every transaction identifier that must be removed from the AOL list.

To refer to the above example again, if the SBT module determines that append message 2 and draft append message three 3 are to be removed, then it simply discards draft append message 3 and specifies sequence number 1 in the SBT finalize message. The receiving mining nodes then determine which transactions were added based on append message sequence number 2 and remove those transaction identifiers from the AOL list. Alternatively, the SBT finalize message includes the delete operations to be applied to remove those transaction identifiers.

In this manner, the journaling block assembler runs independently of the SBT module, which is partially synched to the candidate block versions in terms of the blocking of transaction identifiers in separate append messages, which then enables a quick and elegant synchronization of the AOL list at remote mining nodes on discovery of a solution.

Figure 13:
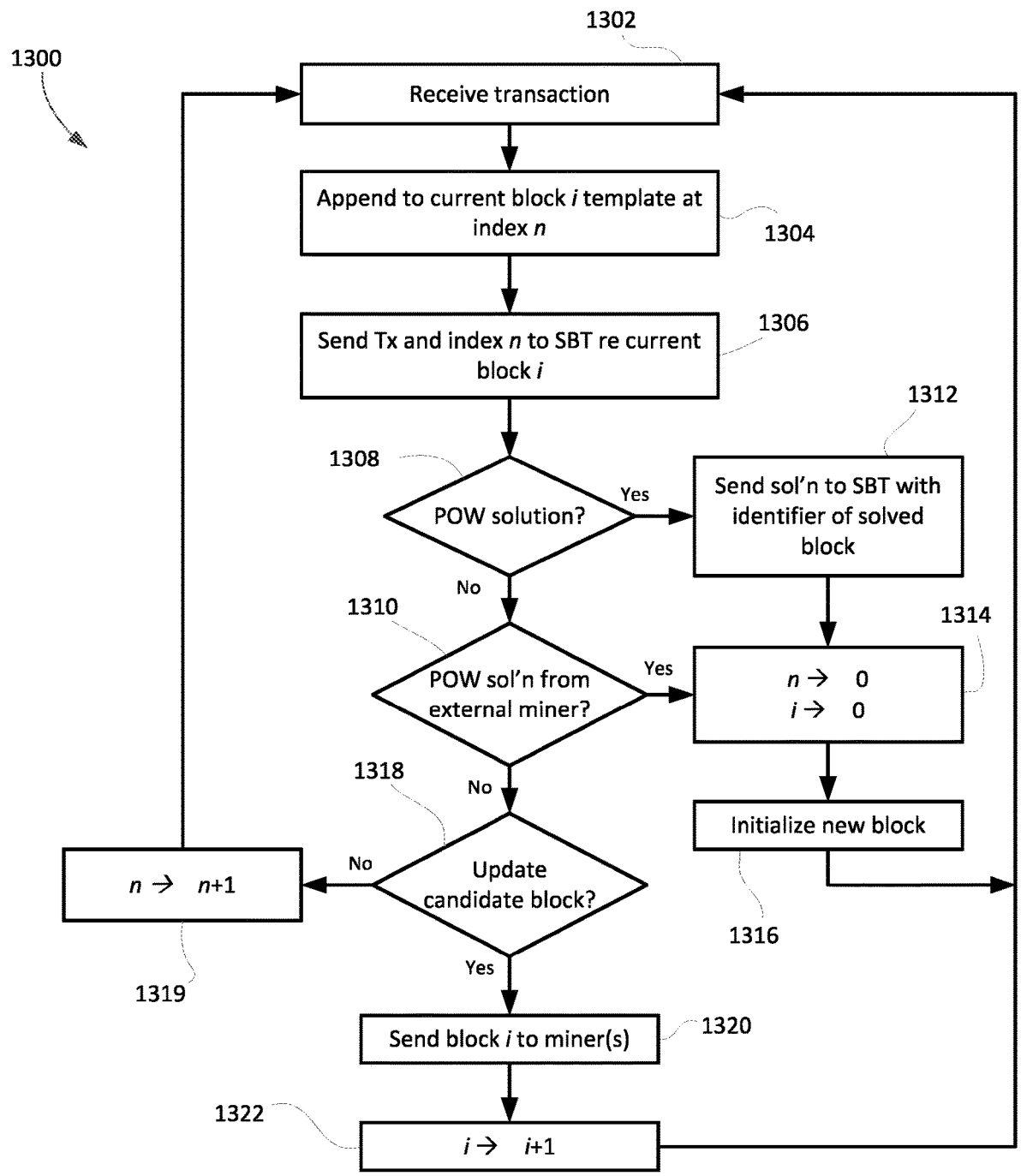
FIG. 13 shows, in flowchart form, one example method of operation of a transaction processor within a mining node.

Reference will now be made to FIG. 13, which shows, in flowchart form one example method 1300 of operation of a transaction processor within a mining node. It will be appreciated that not all operations or functions of the transaction processor are illustrated in the flowchart. Some of the operations described in the flowchart may be carried out by the journaling block assembler. Some of the operations described in the flowchart may be carried out by other portions of the transaction processor other than the journaling block assembler. In some cases, some of the operations described in the flowchart may be carried out by components of the mining node outside of the transaction processor itself.

In operation 1302 a transaction is received. The transaction may be received via the peer-to-peer blockchain network, a Merchant API connection, or otherwise. The transaction processor validates and stores the transaction in a mempool of unconfirmed transactions. In operation 1304, the transaction processor determines that the transaction is to be included in the current candidate block. The basis for that determination may vary in different implementations. In this case, the determination is made and the transaction is appended to the current candidate block having candidate block identifier i. The transaction, as represented by its transaction identifier, may be appended to the candidate block at index n in the ordered list of transactions in the candidate block. The transaction identifier and its index, n, within the candidate block are sent to the SBT module, along with the associated candidate block identifier i in operation 1306.

In operation 1308 the transaction processor evaluates whether a solution has been found by any of its mining units. Notice of a solution from one of the mining units will be accompanied by the candidate block identifier associated with the candidate block that it solved and the details of the solution, e.g. the nonce, Merkle root, etc. If such as solution has been found, then the transaction processor may begin validating the solution and it notifies the SBT module regarding the solution and its associated candidate block identifier, as indicated by operation 1312 so that the SBT module may start the process of notifying other miners and synching their AOL lists. If no such solution has been found, then the transaction processor also assesses whether notice of a solution by an external miner has been received, as indicated by operation 1310. That notification may come via the peer-to-peer blockchain network or via the SBT network. It will be appreciated that the transaction processor may construct the newly-found block from the corresponding AOL list maintained by the SBT module, and will do the work of validating the new block to confirm it is legitimate. A legitimate block may also result in flushing the mempool of transactions that have been confirmed.

If a solution is found either externally or internally, then in operation 1314 the block identifier and index are reset and a new candidate block is initialized by the transaction processor in operation 1316. The process then returns to operation 1302 to begin filling the new candidate block with unconfirmed transactions.

If no solution has been found, then in operation 1318, the transaction processor may determine whether it is to increment the candidate block identifier. As noted above, the transaction processor may be configured to update the candidate block version and identifier on a fixed period basis, e.g. every $1/10^{th}$ of a second. In some cases, the transaction processor may be configured to update the candidate block version and identifier in response to a candidate block request from one or more of the mining units. If no update is due, then the index n is incremented in operation 1319 and the process returns to operation 1302 to continue adding unconfirmed transactions to the current candidate block.

If the candidate block version and index are to be updated, then in operation 1320 the transaction processor may send the then-current candidate block to one or more mining units to be mined, and may increment the candidate block identifier i before returning to operation 1302 to continue adding unconfirmed transactions to the current candidate block.

Figure 14:
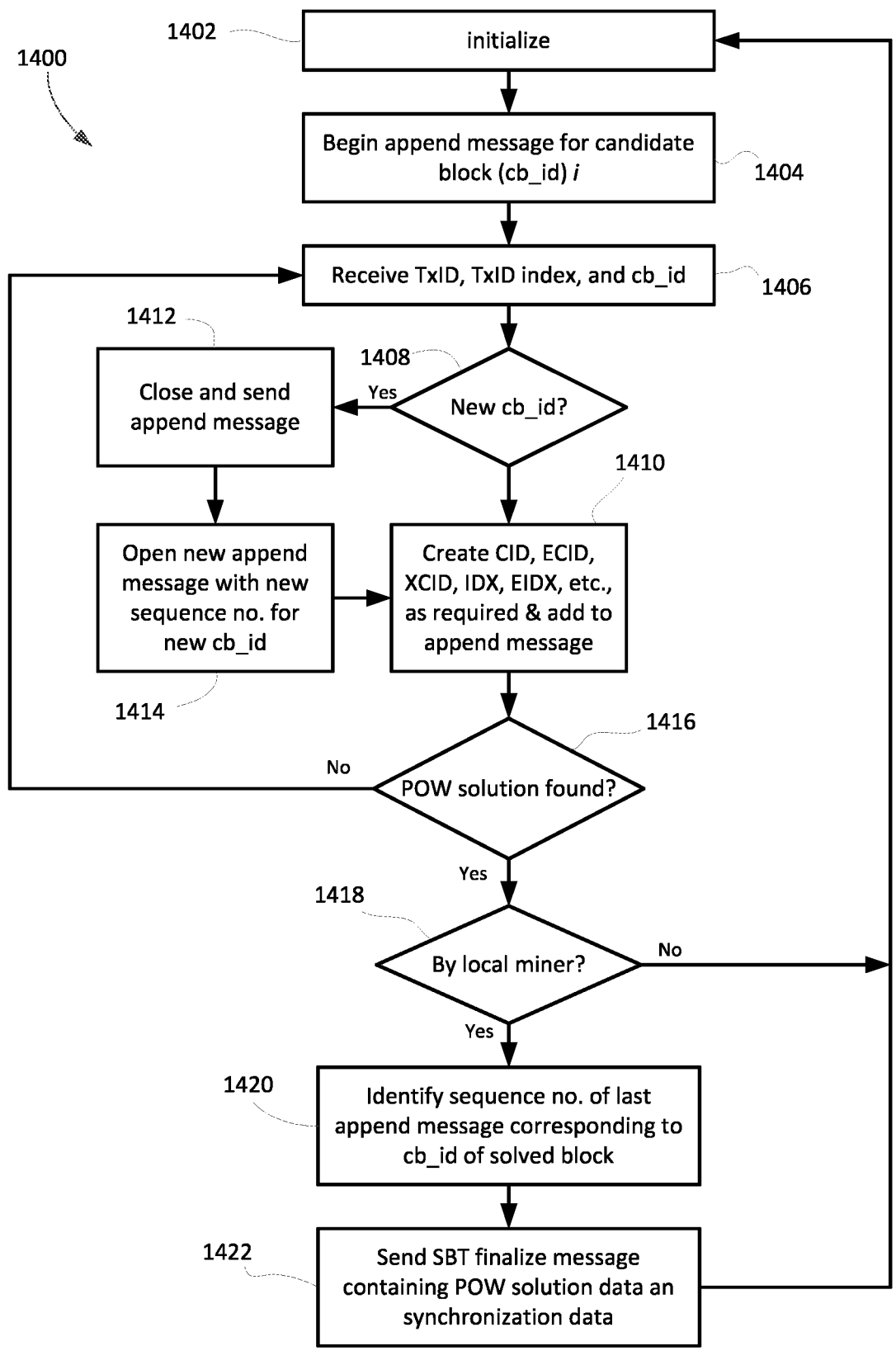
FIG. 14 shows, in flowchart form, one example method of streaming block templates by a mining node.

One example method 1400 of operation of an SBT module within a mining node is illustrated by way of flowchart in FIG. 14. It will be appreciated that not all operations or functions of the SBT module are necessarily illustrated in the flowchart. For example, the flowchart does not illustrate the handling of incoming append messages and the building of corresponding AOL lists, or the TxID compressed identifier generation or resolution processes. Some of the operations described in the flowchart may be carried out by the SBT module. Some of the operations described in the flowchart may be carried out by other components of the mining node outside of the SBT module itself.

In operation 1402, the SBT module may perform initialization, such as clearing data structures, zeroing indexes, allocating memory, etc. Operation 1402 may further includes sending an initialization message to other mining nodes indicating the SB template identifier being used by the mining node for the current block, as well as other parameters. The SBT module begins a draft append message for the current candidate block in operation 1404. The append message may include an SB template identifier, sb_template_id, which may be selected so as not to conflict with any existing SB template identifiers received from other mining nodes, or their compressed versions, if any. The append message may further include a sequence number, which may be initially set to zero.

In operation 1404, the SBT module receives transaction data from the transaction processor, such as a transaction identifier, a candidate block identifier (e.g. cb_id) indicating the candidate block version to which the transaction was appended, and an index indicating the location of the transaction in the ordered list of transactions in the candidate block.

In operation 1408, the SBT module determines whether the received candidate block identifier has been incremented since the most recently-received identifier. If not, then the SBT module knows that the received transaction identifier was added to the current candidate block version and it proceeds to generate a corresponding CID, ECID, XCID, etc., if applicable, and adds a reference to the transactions (e.g. CID, ECID, XCID, ID, IDX, EIDX, etc.) to the draft append message, as indicated by operation 1410.

Assuming no block solution has been found, as indicated by operation 1416, then the method 1400 returns to operation 1406 to process the next transaction data received from the transaction processor. This may continue until the SBT module determines, in operation 1408, that a received transaction identifier from the transaction processor is associated with an incremented candidate block identifier, e.g. cb_id. In such a case, the SBT module then closes the draft append message without adding the new transaction identifier and sends it to other mining nodes, as indicated by operation 1412. It then, in operation 1414, opens a new draft append message with an incremented sequence number, and then proceeds to operation 1410 to add the received transaction identifier (or its compressed form) to the new draft append message.

If a block solution is detected in operation 1416, and it is found by an external mining node, then the SBT module returns to the initialization operation 1402. The AOL lists and data structures are reinitialized and the process of building new candidate blocks begins anew.

If the SBT module receives notice of the solution by the transaction processor indicating that the solution has been found by this mining node, as indicated by operation 1418, then the SBT module prepares an SBT finalize message to be sent to the other mining nodes. In particular, the notice from the transaction processor regarding the found solution contains a reference to the candidate block identifier associated with the solution. In operation 1420, the SBT module determines which append message corresponds to the last-added group of transactions within the candidate block associated with the candidate block identifier. It then, in operation 1422, sends the other mining nodes the SBT finalize message that contains the block solution information and synchronization data. As noted above the synchronization data may include the sequence number of the last valid append message associated with the candidate block that was solved, in some implementations. In some implementations, the synchronization data may include deletion instructions identifying transaction identifiers to be removed from the associated AOL list to sync it to the solved candidate block.

Figure 15:
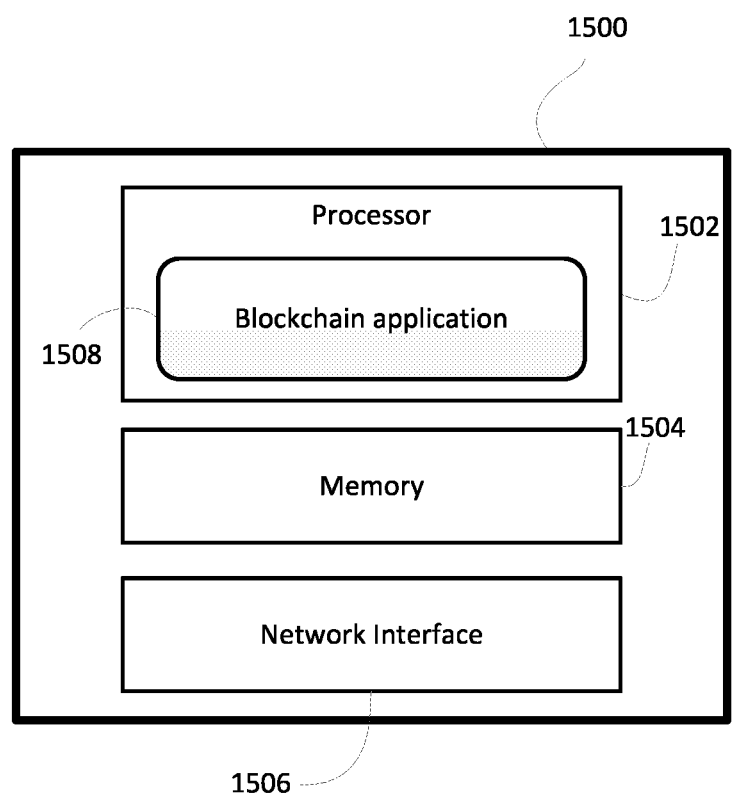
FIG. 15 shows, in block diagram form, a simplified example of a blockchain node.

Reference is now made to FIG. 15, which shows, in block diagram form, a simplified mining node 1500, in accordance with an example of the present application. The mining node 1500 includes a processor 1502, which may include one or more microprocessors, application specific integrated circuits (ASICs), microcontrollers, or similar computer processing devices. The mining node 1500 may further include memory 1504, which may include persistent and non-persistent memory, to store values, variables, and in some instances processor-executable program instructions, and one or more network interfaces 1506.

The mining node 1500 may include a processor-executable blockchain application 1508 containing processor-executable instructions that, when executed, cause the processor 1502 to carry out one or more of the functions or operations described herein.

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

What is claimed is:

1. A computer-implemented method of compressing transaction identifiers by a first mining node in a blockchain network, the method comprising:
   building a first candidate block containing a first ordered list of transaction identifiers, wherein each of the transaction identifiers in the first ordered list is generated by the first mining node by cryptographically hashing a respective transaction;
   iteratively hashing a first candidate block header of the first candidate block and, while iteratively hashing,
      receiving, from a second mining node, data defining a second ordered list of transaction identifiers in a second candidate block being mined by the second mining node;
      determining that at least one of the transaction identifiers in the first ordered list is also in the second ordered list;
      generating an append message containing data defining the first ordered list of transaction identifiers, wherein the data specifies said at least one transaction identifier in the first ordered list of transaction identifiers by including an index position of said at least one transaction identifier in the second ordered list of transaction identifiers; and
      transmitting the append message to the second mining node.

2. The method of claim 1, wherein generating includes determining that the index position is more compact than a compressed transaction identifier for said at least one transaction identifier.

3. The method of claim 2, wherein determining that the index position is more compact includes generating the compressed transaction identifier.

4. The method of claim 3, wherein the first mining node and the second mining node define compressed transaction identifiers of at least two lengths and wherein generating the compressed transaction identifier includes determining that said at least one transaction identifier requires a longer of the at least two lengths due to a collision and, on that basis, determining that the index position is more compact.

5. The method of claim 1, further comprising:
receiving, from a third mining node, data defining a third ordered list of transaction identifiers in a third candidate block being actively mined by the third mining node;
determining that one of the transaction identifiers in the first ordered list is also in the third ordered list; and
specifying said one of the transaction identifiers in the append message by including a reference to the third ordered list and an index position of said one of the transaction identifiers in the third ordered list of transaction identifiers.

6. The method of claim 5, wherein specifying includes first determining that the second mining node stores the third ordered list.

7. The method of claim 6, further comprising receiving, from the second mining node, data specifying lists stored at the second mining node, and wherein the data specifying lists includes a reference to the third ordered list.

8. The method of claim 1, further comprising receiving a second append message from the second mining node, the second append message including data defining a further ordered list of transaction identifiers, resolving the data to obtain the further ordered list of transaction identifiers, and storing the further ordered list of transaction identifiers appended to the second ordered list of transaction identifiers.

9. The method of claim 8, wherein the data includes a reference to a transaction identifier in the first ordered list of transaction identifiers.

10. The method of claim 9, wherein the reference includes an index position within the first ordered list, and wherein resolving includes obtaining the transaction identifier at the index position in the first ordered list.

11. The method of claim 5, further comprising receiving a second append message from the second mining node, the second append message including data defining a further ordered list of transaction identifiers, resolving the data to obtain the further ordered list of transaction identifiers, and storing the further ordered list of transaction identifiers appended to the second ordered list of transaction identifiers, wherein the data includes a reference to a transaction identifier in the third ordered list of transaction identifiers.

12. The method of claim 11, wherein the reference includes a reference to the third ordered list and an index position within the third ordered list, and wherein resolving includes obtaining the transaction identifier at the index position in the third ordered list.

13. The method of claim 12, further comprising sending the second mining node an initialization message that references the third ordered list of transactions.

14. A computing device to compress transaction identifiers in a blockchain network, the computing device including:
one or more processors;
memory; and
processor-executable instructions stored in the memory that, when executed by the one or more processors, cause the processors to:
build a first candidate block containing a first ordered list of transaction identifiers, wherein each of the transaction identifiers in the first ordered list is generated by the computing device by cryptographically hashing a respective transaction;
iteratively hash a first candidate block header of the first candidate block and, while iteratively hashing, receive, from a second mining node, data defining a second ordered list of transaction identifiers in a second candidate block being mined by the second mining node;
determine that at least one of the transaction identifiers in the first ordered list is also in the second ordered list;
generate an append message containing data defining the first ordered list of transaction identifiers, wherein the data specifies said at least one transaction identifier in the first ordered list of transaction identifiers by including an index position of said at least one transaction identifier in the second ordered list of transaction identifiers; and
transmit the append message to the second mining node.

15. The computing device of claim 14, wherein the instructions, when executed, are to cause the one or more processors to generate at least in part by determining that the index position is more compact than a compressed transaction identifier for said at least one transaction identifier.

16. The computing device of claim 15, wherein the first mining node and the second mining node define compressed transaction identifiers of at least two lengths, and wherein the instructions, when executed, are to cause the one or more processors to determine that the index position is more compact by generating the compressed transaction identifier at least in part by determining that said at least one transaction identifier requires a longer of the at least two lengths due to a collision and, on that basis, determining that the index position is more compact.

17. The computing device of claim 14, wherein the instructions, when executed, are to further cause the one or more processors to:
receive, from a third mining node, data defining a third ordered list of transaction identifiers in a third candidate block being actively mined by the third mining node;
determine that one of the transaction identifiers in the first ordered list is also in the third ordered list; and
specify said one of the transaction identifiers in the append message by including a reference to the third ordered list an index position of said one of the transaction identifiers in the third ordered list of transaction identifiers.

18. The computing device of claim 17, wherein the instructions, when executed, are to further cause the one or more processors to receive a second append message from the second mining node, the second append message including data defining a further ordered list of transaction identifiers, resolve the data to obtain the further ordered list of transaction identifiers, and store the further ordered list of transaction identifiers appended to the second ordered list of transaction identifiers, wherein the data includes a reference to a transaction identifier in the third ordered list of transaction identifiers.

19. The computing device of claim 14, wherein the instructions, when executed, are to further cause the one or more processors to receive a second append message from the second mining node, the second append message including data defining a further ordered list of transaction identifiers, resolve the data to obtain the further ordered list of transaction identifiers, and store the further ordered list of transaction identifiers appended to the second ordered list of transaction identifiers.

20. A non-transitory computer-readable medium storing processor-executable instructions for compressing transaction identifiers in a blockchain network, the processor-executable instructions including instructions that, when executed by one or more processors, cause the processors to:
  build a first candidate block containing a first ordered list of transaction identifiers, wherein each of the transaction identifiers in the first ordered list is generated by the one or more processors by cryptographically hashing a respective transaction;
  iteratively hash a first candidate block header of the first candidate block and, while iteratively hashing,
    receive, from a second mining node, data defining a second ordered list of transaction identifiers in a second candidate block being mined by the second mining node;
    determine that at least one of the transaction identifiers in the first ordered list is also in the second ordered list;
    generate an append message containing data defining the first ordered list of transaction identifiers, wherein the data specifies said at least one transaction identifier in the first ordered list of transaction identifiers by including an index position of said at least one transaction identifier in the second ordered list of transaction identifiers; and
    transmit the append message to the second mining node.

* * * * *